(12) United States Patent
Dudar

(10) Patent No.: US 11,208,963 B1
(45) Date of Patent: Dec. 28, 2021

(54) METHOD AND SYSTEM FOR A VEHICLE EVAPORATIVE EMISSIONS CONTROL SYSTEM

(71) Applicant: Ford Global Technologies, LLC, Dearborn, MI (US)

(72) Inventor: Aed M Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/094,128

(22) Filed: Nov. 10, 2020

(51) Int. Cl.
*F02D 41/22* (2006.01)
*F02D 41/00* (2006.01)

(52) U.S. Cl.
CPC ......... *F02D 41/0045* (2013.01); *F02D 41/22* (2013.01); *F02D 2200/0602* (2013.01); *F02D 2200/0606* (2013.01); *F02D 2200/0611* (2013.01); *F02D 2200/701* (2013.01)

(58) Field of Classification Search
CPC .............. F02D 41/0045; F02D 41/22; F02D 2200/0611; F02D 2200/0602; F02D 2200/0606; F02D 2200/701

USPC ......... 123/516, 518, 519, 520; 701/102–105, 701/115, 23–26, 116
See application file for complete search history.

(56) References Cited

U.S. PATENT DOCUMENTS

| | | | |
|---|---|---|---|
| 9,624,853 B2 | 4/2017 | Dudar et al. | |
| 10,054,070 B2 * | 8/2018 | Dudar | F02M 35/10393 |
| 10,968,846 B2 * | 4/2021 | Dudar | F02D 41/221 |

* cited by examiner

*Primary Examiner* — Hai H Huynh
(74) *Attorney, Agent, or Firm* — Geoffrey Brumbaugh; McCoy Russell LLP

(57) ABSTRACT

Methods and systems are provided herein for increasing an efficiency of an evaporative emissions system of a vehicle by adjusting a purge flow in response to a predicted vapor slug. In one example, a method for an engine of a vehicle includes, upon approaching a location of a predicted vapor slug, ramping down a purge flow rate from a fuel vapor canister to an engine intake, the location of the predicted vapor slug inferred based on communication of the vehicle with one or more other vehicles and/or a network cloud.

20 Claims, 9 Drawing Sheets

METHOD AND SYSTEM FOR A VEHICLE EVAPORATIVE EMISSIONS CONTROL SYSTEM

FIELD

The present description relates generally to methods and systems for increasing an efficiency of an evaporative emissions system of a vehicle, and more specifically, to adjusting a purge flow of the evaporative emissions system in response to a predicted vapor slug.

BACKGROUND/SUMMARY

Vehicles may be fitted with evaporative emission control (EVAP) systems such as onboard fuel vapor recovery systems. Such systems capture and reduce release of vaporized hydrocarbons to the atmosphere, for example, fuel vapors released from a vehicle gasoline tank during refueling. Specifically, the vaporized hydrocarbons (HCs) are stored in a fuel vapor canister packed with an adsorbent which adsorbs and stores the vapors. At a later time, when the engine is in operation, the evaporative emission control system allows the vapors to be purged into the engine intake manifold for use as fuel. A fuel tank may include one or more passive valves which may vent pressurized air in the fuel tank to a canister purge line via a vapor recovery line.

During purge control cycles, when vehicle motion causes a fuel slosh, liquid fuel (referred to herein as a vapor slug) may suddenly intrude into the canister purge line. Vapor slugs can cause engine stalls due to a rapid change in the fuel/air mix purged into the engine intake manifold. Sources of vapor slug generation include unexpected potholes, bumps in roads, and obstacles in roads that cause rapid braking, and vapor slugs may be inferred based on rapid vehicle deceleration and/or a sudden change in fuel tank pressure. If vapor slug generation is inferred, a current strategy is to abruptly shut off purge control to avoid a rich fuel excursion into the engine intake.

However, the inventors herein have recognized several potential issues with this strategy. While engine stalls due to vapor slugs may be averted, shutting off purge control may cause an engine to hesitate, and may result in undesired emissions. When vehicles run on a purge cycle in order to meet emissions standards during a drive cycle, clearing the canister is a primary concern, and a purge shutoff may compromise vapor canister cleanliness. Additionally, after a shutoff, purge control may typically be ramped up to a desired purge level slowly in order to avoid engine stalls, causing a delay in achieving a target efficiency.

In one example, the issues described above may be addressed by a method for an engine of a vehicle, comprising, upon approaching a location of a predicted vapor slug, ramping down a purge flow rate from a fuel vapor canister to an engine intake, the location of the predicted vapor slug inferred based on communication of the vehicle with one or more other vehicles and/or a network cloud.

As an example, an unexpected obstacle on a route of a first set of vehicles may cause one or more vehicles in the first set of vehicles to brake suddenly, generating a fuel slosh where a vapor slug (e.g., liquid fuel) is drawn into a vapor recovery line of the respective vehicle by engine vacuum during a purge cycle. A controller of the respective vehicle may detect the vapor slug, shut off purge control of the vehicle to avert an engine stall, and send a location-tagged notification of vapor slug activity to a server in a cloud via a modem of the first vehicle. The server may transmit the location of the vapor slug activity to a second set of vehicles traveling on the route, whereby respective controllers of one or more vehicles in the second set of vehicles may ramp down a purge flow rate in the respective vehicle in anticipation of possible upcoming vapor slug activity. If a vapor slug is detected by one or more vehicles in the second set of vehicle upon reaching the obstacle, the purge flow of the one or more vehicles in the second set of vehicle may be stopped from the already decreased flow. If a vapor slug is not detected, the purge flow may be ramped up more rapidly from the decreased flow than from a stopped flow. Further, if at least one vehicle the second set of vehicle is an autonomous vehicle, the autonomous vehicle may be rerouted or instructed to change lanes to avoid the obstacle and continue normal purge control. If the obstacle is encountered by one or more vehicles in the second set of vehicle, the respective controller of the vehicle may transmit a confirmation to the server in the cloud of possible vapor slug activity at the location of the obstacle. If the obstacle is not encountered by any vehicle in the second set of vehicles, the controller may notify the server that no vapor slug activity was generated at the location of the obstacle, whereby the server may infer that the obstacle has been removed, and may no longer transmit warnings of possible vapor slug activity at the location of the obstacle to other vehicles on the route.

In this way, future vapor slug activity may be predicted from data transmitted to a remote server from a network of vehicles. Predictions of vapor slug activity at a location may be transmitted to a vehicle prior to the vehicle reaching the location, which may allow the vehicle to mitigate a disruption of an EVAP system of the vehicle. The technical effect of ramping down a purge flow rate of a vehicle in anticipation of possible vapor slug activity is that the vehicle may maximize an efficiency of an EVAP system of the vehicle. If a vapor slug is generated, shutting off a decreased purge flow (e.g., at 20%) may result in less disturbance of engine combustion quality than reducing the purge flow from 100% to 0%. If a vapor slug is not generated, the purge flow rate may be ramped up to normal purge flow levels more rapidly, due to starting at the decreased purge flow rather than a purge flow of zero. By controlling the purge cycle via a proportional feed forward control rather than as a step function, where a canister purge valve is either fully opened or fully closed (e.g., bang bang control), an overall fuel efficiency of the vehicle may be increased, and a level of emissions of the vehicle may be reduced by increasing vapor canister cleanliness.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
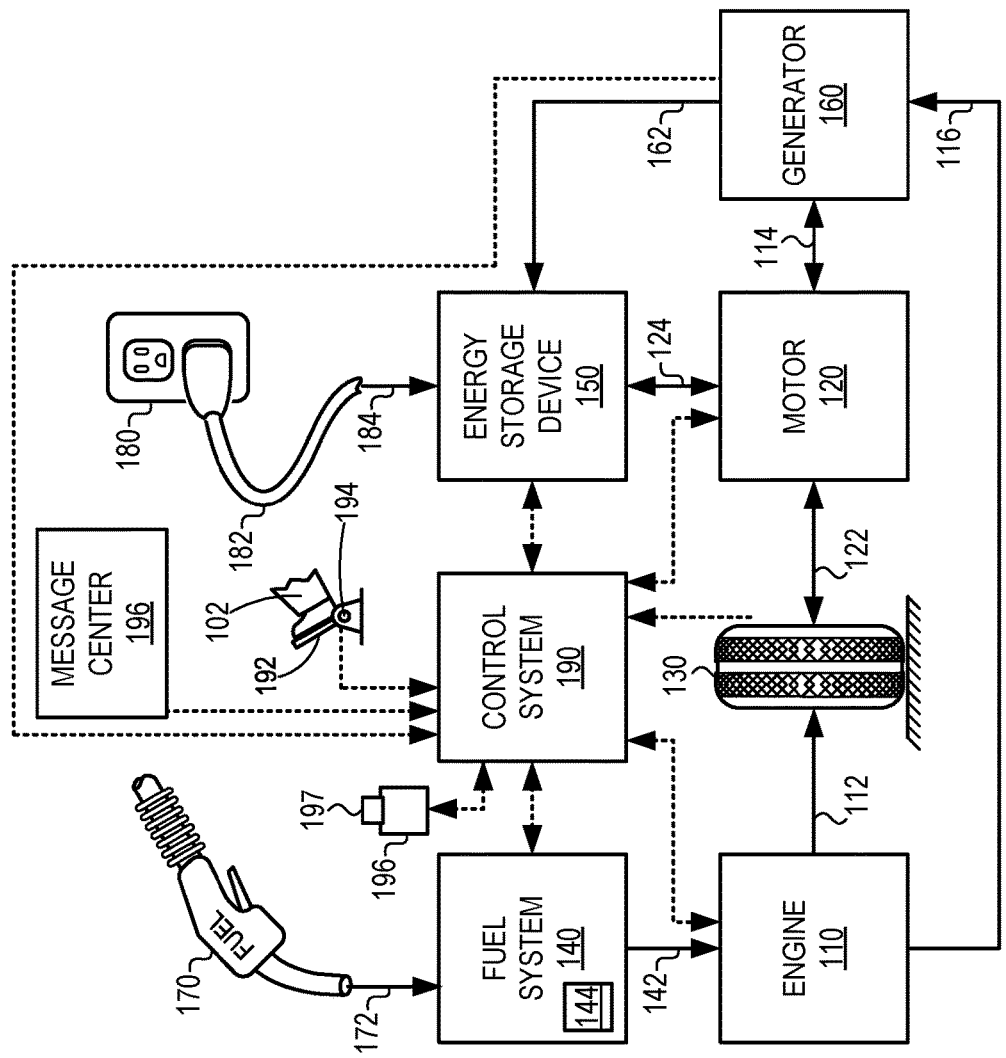
FIG. 1 shows an example vehicle propulsion system.
Figure 2:
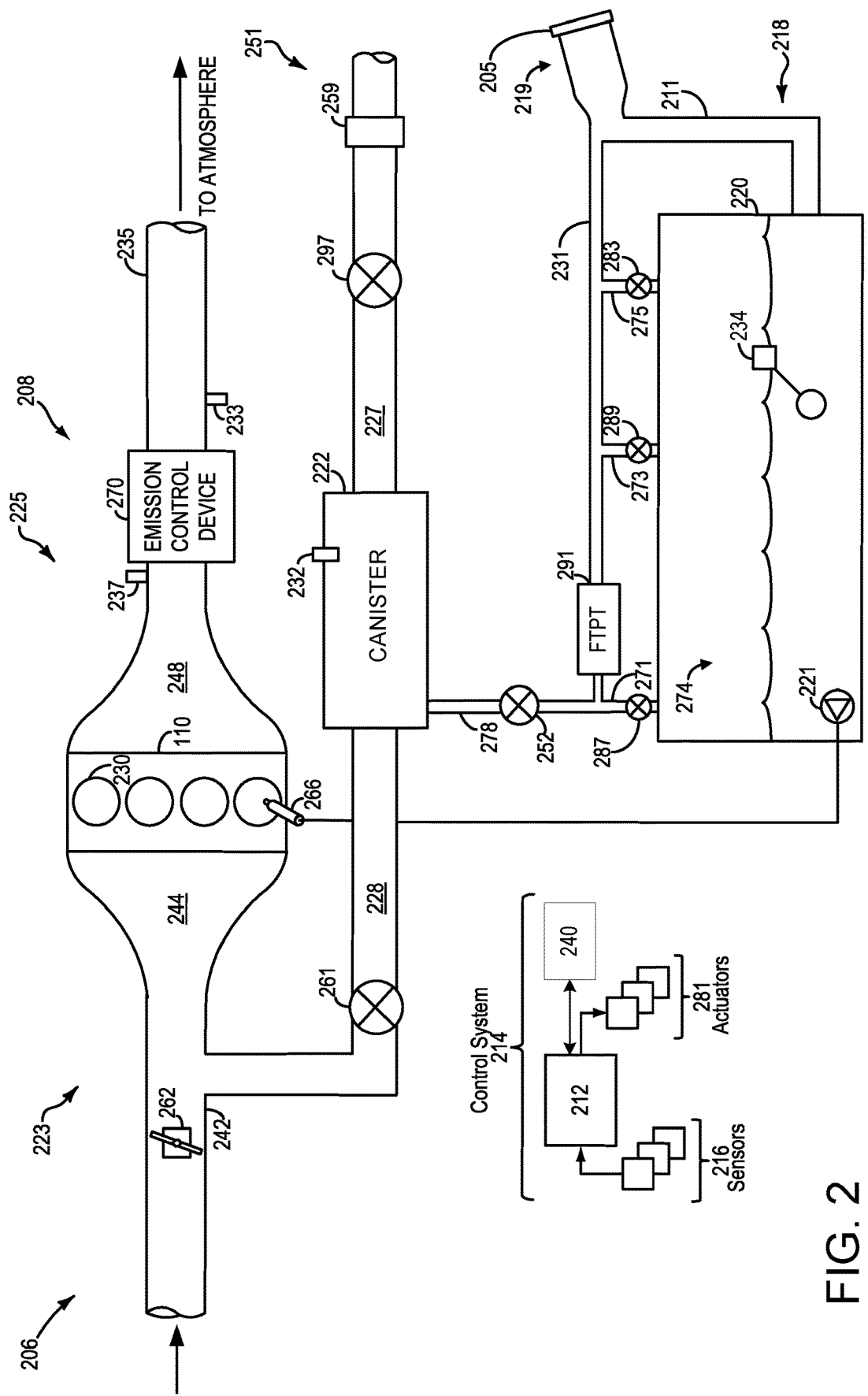
FIG. 2 shows an example vehicle system with a fuel system and an EVAP system.
Figure 3:
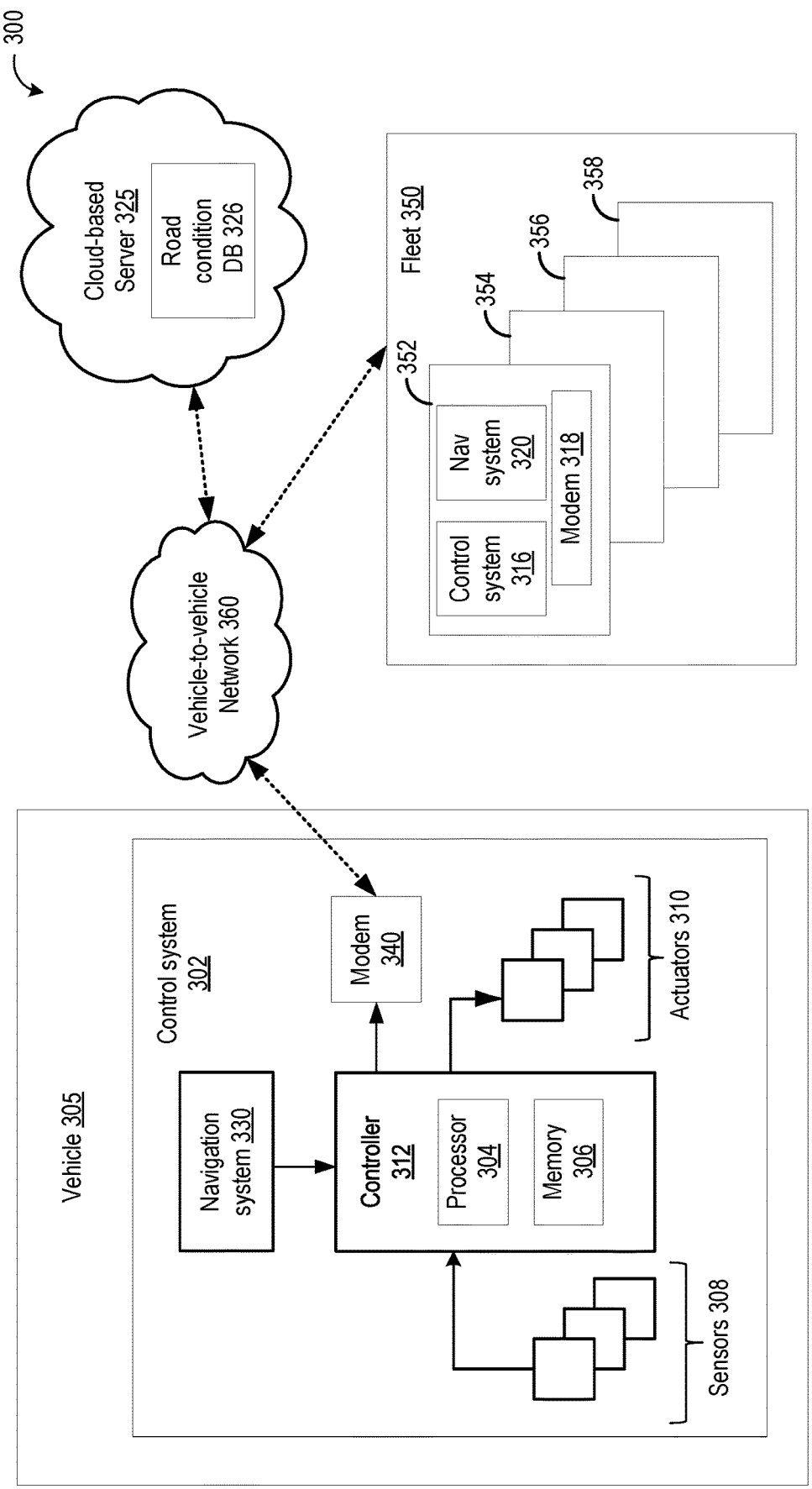
FIG. 3 shows an example embodiment of a vehicle control system, in communication with an external network and a fleet of vehicles.
Figure 4:
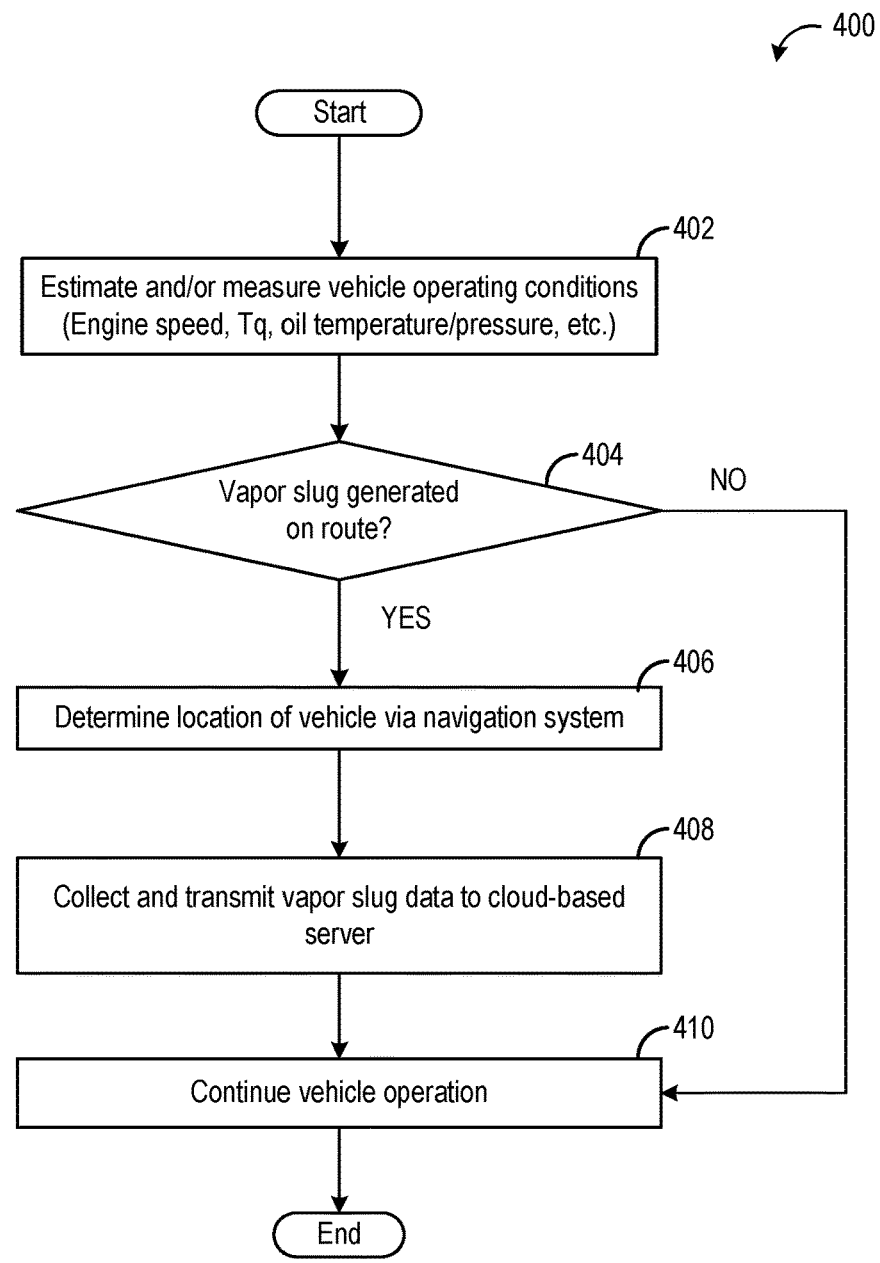
FIG. 4 is a flowchart illustrating an example method for notifying a cloud-based server of vapor slug activity on a route of a vehicle.

An example hybrid vehicle propulsion system of a vehicle is depicted in FIG. 1. The vehicle propulsion system may include an engine system, an evaporative emission control (EVAP) system, and a fuel system with a fuel tank, as shown in FIG. 2. A controller of the vehicle propulsion system may be in communication with a fleet of vehicles and a cloud-based server via a vehicle-to-vehicle (V2V) or other wireless networks, as shown in FIG. 3. The controller may notify the cloud-based server of vapor slug activity occurring on a route of the vehicle, as shown by FIG. 4. The controller may be configured to carry out a routine for determining whether to adjust a purge flow rate (also referred to herein as purge flow) of the EVAP system based on a predicted vapor slug, as exemplified by the method of FIG. 5. In the event of a predicted vapor slug, the purge flow of the EVAP system may be ramped down prior to reaching a location of the predicted vapor slug to increase an efficiency of the EVAP system, according to the method described in FIG. 6. The ramping down of the purge flow rate of the EVAP system may be timed in accordance with the example operational sequence shown by FIG. 7A, in the case of a predicted vapor slug occurring, and FIG. 7B, in the case of a predicted vapor slug not occurring. A matrix plot may be used to determine if a vehicle is prone to vapor slugs from a set of operating parameters of the vehicle, as shown in FIG. 8.

FIG. 1 illustrates an example vehicle propulsion system 100 of a vehicle. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

The fuel system 140 may include a vapor recovery line, which may be used to allow fuel vapors in the fuel tank 144 to vent to a vapor canister via one or more passive vent valves (e.g., grade vent valves, fuel limit valves, fuel intake valves, etc.). In some examples, the vapor recovery line may be an external vapor line arranged outside the fuel tank, and the one or more passive vent valves may be arranged on conduits that couple the vapor line to the fuel tank 144. In other examples, the vapor recovery line may be an internal vapor recovery line arranged inside the fuel tank 144, where the passive vent valves are coupled to the internal vapor recovery line.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Further, control system 190 may send control signals to adjust a state of one or more of engine 110, motor 120, fuel system 140, energy storage device 150, and generator 160 responsive to sensory feedback. For example, adjusting a state of the fuel system 140 may include adjusting an actuator of the fuel system (e.g., a fuel tank intake valve, canister vent valve, canister purge valve, etc.). Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. In some examples, a global positioning system (GPS) device may be coupled to the control system 190. A location of the vehicle may be determined via the GPS system. In one example, a diagnostic routine of the fuel system may use the GPS device to determine a proximity of the vehicle to a refueling station.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system. The fuel system 218 may be the same as or similar to the fuel system 140 of vehicle propulsion system 100 of FIG. 1.

The engine system 208 may include an engine 110 having a plurality of cylinders 230. The engine 110 includes an engine air intake 223 and an engine exhaust 225. The engine air intake 223 includes a throttle 262 in fluidic communication with engine intake manifold 244 via an intake passage 242. The engine exhaust system 225 includes an exhaust manifold 248 leading to an exhaust passage 235 that routes exhaust gas to the atmosphere. The engine exhaust system 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220, which may be coupled to a fuel pump system 221. The fuel pump system 221 may include one or more pumps for pressurizing fuel delivered to the injectors of engine 110, such as the example injector 266 shown. In an embodiment, the fuel pump system 221 is arranged inside the fuel tank 220. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an EVAP system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

In some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211. Further, in some examples, one or more fuel tank vent valves may be positioned in conduits 271, 277, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 275 may include a GVV 283, and conduit 277 may include a fill limit venting valve (FLVV) 289.

Emissions control system 251 may include one or more emissions control devices, such as one or more fuel vapor canisters 222 filled with an appropriate adsorbent, where the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV 297 may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a normally open valve that is closed upon actuation of the canister vent solenoid. In some examples, CVV 297 may be configured as a latchable solenoid valve, where when the valve is placed in a closed configuration, it latches closed without requiring additional current or voltage. For example, the valve may be closed with a 100 ms pulse, and then opened at a later time point with another 100 ms pulse. In this way, the amount of battery power used to maintain the CVV closed is reduced. In particular, the CVV may be closed while the vehicle is off, thus maintaining battery power while maintaining the fuel emissions control system sealed from atmosphere.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not combusting air and fuel), wherein the controller 212 may open isolation valve 252 while closing canister purge valve (CPV) 261 to direct refueling vapors into canister 222 while preventing fuel vapors from being directed into the intake manifold. In another example, the refueling vapors may be vented from the fuel tank directly into the intake manifold 244 via the purge line 228, whereby fuel vapors that reach the intake manifold 244 may be purged into the engine 110 during operation of the engine 110.

In yet another example, the fuel system may be operated in a canister purging mode (e.g., after an emission control device light-off temperature has been attained and with the engine combusting air and fuel), wherein the controller 212 may open canister purge valve 261 while closing isolation valve 252. Herein, the vacuum generated by the intake manifold of the operating engine may be used to draw fresh air through vent 227 and through fuel vapor canister 222 to purge the stored fuel vapors into intake manifold 44. In this mode, the purged fuel vapors from the canister are combusted in the engine. The purging may be continued until the stored fuel vapor amount in the canister is below a threshold.

Vehicle system 206 may include a control system 214, which may be the same as or similar to the control system 190 of vehicle propulsion system 100. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines. The controller 212 may be coupled to a wireless communication device 240 for direct communication of the vehicle system 206 with a network cloud. As described herein with regard to FIGS. 4 and 5, the vehicle system 206 may use the wireless communication device 240 to retrieve road condition information from a network cloud and/or other vehicles to adjust evaporative emissions routines.

Undesired evaporative emissions detection routines may be intermittently performed by controller 212 on fuel system 218 and/or EVAP system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown and/or with vacuum supplemented from a vacuum pump (not depicted in FIG. 2). Alternatively, evaporative emissions detection routines may be performed while the engine is running by operating a vacuum pump and/or using engine intake manifold vacuum.

Other evaporative emissions routines may be triggered by a pressure change of the fuel system 218 detected by the pressure sensor 291. For example, if a fuel slosh occurs (e.g., as a result of hitting a bump or a pothole, or as a result of an abrupt deceleration), liquid fuel (e.g., a vapor slug) may enter into the vapor recovery line 231. If a vapor slug enters the vapor recovery line 231, the pressure sensor 291 may register an increase in the pressure of the fuel system 218. As a result of the pressure increase, an evaporative emissions routine may adjust one or more valves of the EVAP system to ensure that the vapor slug is not drawn into the engine intake manifold 244 during a purge cycle by an engine vacuum, thereby averting an engine stall due to a rich fuel excursion. For example, a purge flow rate may be ramped down by progressively and incrementally adjusting the CPV 261 towards a closed position as the vehicle approaches a location where vapor slug activity is predicted, and then ramped up by progressively and incrementally adjusting the CPV 261 towards an open position after passing the location where vapor slug activity is predicted. If a vapor slug is generated, the CPV 261 may be adjusted from a partially closed position to a fully closed position, whereby the purge flow is stopped without generating a disruption to the engine that could be generated by adjusting the CPV 261 from a fully open position to a fully closed position. In some examples, vapor slug activity may be predicted based on a communication of the vehicle with one or more other vehicles and/or a network cloud, via the wireless communication device 240. The adjusting of the one or more valves of the EVAP system to ensure that the vapor slug is not drawn into the engine is described in greater detail below in relation to FIG. 4.

Turning to FIG. 3, a schematic depiction 300 of a control system 302 of a vehicle 305 is shown, where the control system 302 is in communication with a fleet of vehicles 350 and a cloud-based server 325 via a vehicle-to-vehicle (V2V) network 330. The control system 302 may be the same as or similar to the control system 190 of vehicle propulsion system 100 and/or control system 214 of FIG. 2. Control system 302 is shown receiving information from a plurality of sensors 308 and sending control signals to a plurality of actuators 310. As one example, sensors 308 may include one or more of an exhaust gas sensor, an upstream and/or downstream temperature sensor, an airflow sensor, a pressure sensor, an air/fuel ratio sensor, a catalyst temperature sensor. The actuators may include a fuel injector, a throttle, one or more valves of an engine or fuel system, etc. It should be appreciated that the examples provided herein are for illustrative purposes and other types of sensors and/or actuators may be included without departing from the scope of this disclosure.

The control system 302 may include a controller 312 (e.g., the controller 212 of control system 214 of FIG. 2). The controller 312 may include a processor 304. The processor 304 may generally include any number of microprocessors, ASICs, ICs, etc. The controller 312 may include a memory 306 (e.g., FLASH, ROM, RAM, EPROM and/or EEPROM) that stores instructions that may be executed to carry out one more control routines. As discussed herein, memory includes any non-transient computer readable medium in which programming instructions are stored. For the purposes of this disclosure, the term tangible computer readable medium is expressly defined to include any type of computer readable storage. The example methods and systems may be implemented using coded instruction (e.g., computer readable instructions) stored on a non-transient computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include any other medium which can be used to store the desired electronic format of information and which can be accessed by the processor or processors or at least a portion of a computing device.

In general, controller 312 receives input from various sensors 308 of the vehicle 305 that indicate engine, transmission, electrical and climate states. For example, a vehicle speed may be communicated to controller 312 via a speed sensor, which may be used to determine a positive or negative acceleration of the vehicle 305. The controller 312 may trigger the actuators 310 in response to the processed input data based on instructions stored in the memory 306. For example, the controller 312 may receive input data from an air/fuel ratio sensor indicating that an air/fuel ratio of the engine is low, and as a result, the controller 312 may command a fuel injector of the vehicle 305 to adjust the air/fuel ratio.

The control system 302 may include a navigation system 330, which may receive information from the vehicle speed sensor, GPS, traffic flow data, local gradient maps, etc. In one configuration, the navigation system 330 may be an in-vehicle GPS system. In another configuration, the navigation system 330 may comprise a location-enabled mobile device, such as a smart phone or standalone GPS unit.

The control system 302 may include a modem 340 or a wireless communication device (e.g., the wireless communication device 240 of FIG. 2). Via the modem 340, the controller 312 may communicate over the V2V network 360 with the cloud-based server 325 and a fleet of vehicles 350 including a vehicle 352, a vehicle 354, a vehicle 356, and a vehicle 358. In an embodiment, the V2V network is a controller area network (CAN) implemented using any number of communication protocols generally known. Using the modem 340, the controller 312 of the vehicle 305 may retrieve data from the vehicles 352, 354, 356, and 358 via the V2V network 330. For example, the data may include road condition data from a vehicle traveling ahead of the vehicle 305 on a route of the vehicle 305, whereby the controller 312 may adjust one or more system settings of the vehicle 305 in anticipation of the upcoming road condition. As described in further detail below in FIG. 4, in one example, the controller 312 may perform a routine of an EVAP system of the vehicle 305 in response to an upcoming road condition.

The cloud-based server 325 may include one or more databases. As one example, the cloud-based server 325 may include road condition database 326, wherein road conditions encountered by one or more of the vehicles of the fleet 350 on a route may be recorded and stored for retrieval by other vehicles of the fleet 350 travelling on the route. The controller 312 may be able to run an application for connecting to a cloud-based server 325 and/or collecting information for transmission to the cloud-based server 325 and/or receiving information from the cloud-based server 325. For example, the application may retrieve information gathered by vehicle systems/sensors, input devices, devices such as a mobile device connected via a Bluetooth® link, and the like, and send the information gathered to the cloud-based server 325 for processing. The navigation system 330 may determine a current location of the vehicle 305, which may be transmitted to the cloud-based server 325 from the vehicle to be used in processing the information gathered.

In one example, the vehicles 352, 354, 356, and 358 of fleet 350 may each be similar in make and model to the vehicle 305. In other examples, the vehicles 352, 354, 356, and 358 of fleet 350 may be vehicles within a threshold distance of vehicle 305. In one example, the threshold distance may be defined as a distance within which one or more road conditions experienced by the vehicles 352, 354, 356, and 358 are considered to be similar to those of vehicle 305. In another example, the threshold distance may be a distance that the vehicle 305 can cover in a pre-established duration (e.g., 1 minute), whereby a road attribute located at the threshold distance is reached in 1 minute. Each of the vehicles 352, 354, 356, and 358 of fleet 350 may include a control system 316, a modem 318, and a navigation system 320, which may be the same as or similar to the control system 302, navigation system 330, and a modem 340 of the vehicle 305. The on-board controllers in the vehicles 352, 354, 356, and 358 may communicate with each other and to the on-board controller in vehicle 305 via their respective modem 318, navigation system 320, and/or via other forms of V2V technology. In this way, the vehicle 305 may communicate with remote sources (e.g., an external network cloud, other vehicles, a navigational database of road attributes) using one or multiple technologies e.g., wireless communication, navigation system and V2V.

In one example, the fleet 350 is within a threshold radius of the vehicle 305, and the road conditions encountered by each of the vehicles 352, 354, 356, and 358 of the fleet may be similar to the conditions experienced by the vehicle 305. A statistical weighted average of an estimate retrieved from each vehicle of the remote fleet of vehicles may be used by the control system 302 of vehicle 305 to determine a future driving condition of the vehicle 305. For example, when the average vehicle speed of fleet 350 is lower than a threshold (e.g., 5 mph), and has continued to remain under the threshold for a certain duration, it may be determined that the vehicle 305 may encounter slow moving traffic or stopped vehicles in the future. As such, the navigation system 330 may be able to determine the traffic conditions, and further estimate a time for which the condition may persist.

Various kinds of data may be exchanged between the vehicle 305 and the remote sources. The data may include a preview of upcoming traffic conditions, types of roads, accidents or construction along the route, stalled or stopped vehicles, number of traffic lights, and the like, all of which may be received concurrently or sequentially. Information relayed within the vehicle network may include one or more of vehicle speed, an average speed of vehicles within the vehicle network, duration for which the speed is maintained, and the like. In other examples, when higher average speeds are maintained for longer duration, it may indicate cruising conditions. As one example, the vehicle 305 may retrieve road condition data from the cloud-based server 325 to determine whether a route of the vehicle 305 includes a rough or bumpy road (e.g., where there may be potholes), and in response to data indicating a rough or bumpy road, the vehicle 305 may adjust the route of the vehicle 305 or perform an EVAP routine to maximize an efficiency of the EVAP system of the vehicle 305 on the rough or bumpy road.

Referring now to FIG. 4, an exemplary method 400 is shown for notifying a cloud-based server of vapor slug activity occurring in a vehicle travelling on a route. Instructions for carrying out method 400 and all other methods included herein may be executed by a controller (e.g., the controller 212 of control system 214 of FIG. 2) based on instructions stored on a memory of the controller and in conjunction with signals received from sensors of the vehicle propulsion system, such as the sensors described above in relation to FIGS. 1-2. The controller may employ actuators of the vehicle propulsion system in accordance with the methods described below.

At 402, method 400 includes estimating and/or measuring vehicle operating conditions. Vehicle operating conditions may be estimated based on one or more outputs of various sensors of the vehicle (e.g., such as oil temperature sensors, engine speed or wheel speed sensors, torque sensors, etc., as described above in reference to vehicle propulsion system 100 of FIG. 1). Vehicle operating conditions may include engine speed and load, vehicle speed, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor speed, battery charge, engine torque output, vehicle wheel torque, etc. Estimating and/or measuring vehicle operating conditions may include determining whether the HEV vehicle is being powered by an engine or an electric motor (e.g., the engine 110 or the electric motor 120 of vehicle propulsion system 100 of FIG. 1). Estimating and/or measuring vehicle operating conditions may further include determining a state of a fuel system of the vehicle, such as a level of fuel in the fuel tank, and determining a state of one or more valves of the fuel system (e.g., a refueling valve, vapor blocking valve, etc.).

At 404, method 400 includes determining whether a vapor slug has been generated in the vehicle on the route. For example, the route may include a rough section including one or more potholes. Upon reaching the rough section, the vehicle may unexpectedly hit a pothole of the one or more potholes, which may cause a rapid negative acceleration of the vehicle (e.g., due to a combination of an abrupt braking event and an impact of a wheel of the vehicle with the pothole). As a result of the rapid negative acceleration of the vehicle, a fuel slosh may occur, where liquid fuel in the fuel tank enters a vapor recovery line of the fuel tank via one or more vent valves (e.g., the vent valves GVV 287, FLVV 285, and GVV 283 of the fuel system 218 of FIG. 2), thereby creating a vapor slug. As a result of a blockage of the vapor recovery line caused by the vapor slug, fuel vapors of the fuel tank may not be vented to a vapor canister of the vehicle (e.g., the vapor canister 222 of the EVAP system 251 of FIG. 2), whereby a pressure of the fuel tank may increase. Upon detection of the increase in pressure, a vapor blocking valve of the EVAP system (e.g., the VBV 252 of fuel system 218 of FIG. 2) may be adjusted to a closed position to block the vapor slug from being drawn into a purge line of the EVAP system during a purge cycle by an engine vacuum, thereby averting a possible engine stall as a result of an abrupt change in a richness of an air/fuel mixture of a purge flow of the vehicle.

If a vapor slug is not generated on the route, method 400 proceeds to 410. At 410, method 400 includes continuing vehicle operation without adjustments to any EVAP system valves. Alternatively, if a vapor slug is generated on the route, method 400 proceeds to 406. At 406, method 400 includes determining a location of the vehicle at the time the vapor slug is generated. In one example, the location of the vehicle is determined via an onboard navigation system (e.g., a global positioning system (GPS)).

At 408, method 400 includes collecting and transmitting vapor slug data to a cloud-based server. The vapor slug data may include the location determined at 406, and data on a motion or impact of the vehicle that generated the vapor slug. For example, the vapor slug data may include a rate of negative acceleration of the vehicle (e.g., how much and/or quickly the vehicle slowed down when a pothole was encountered) calculated based on an output of one or more engine, wheel, and/or other vehicle sensors. The vapor slug data may include braking data of the vehicle, such as a time of initiation/termination of braking and/or a braking duration.

The vapor slug data may include other conditions and/or characteristics of the road and/or the environment at the location. The onboard navigation system of the vehicle may determine that the vehicle is travelling on a highway, or a busy urban road, or a rural road. One or more external cameras of the vehicle may detect from images of dust in the air that the vehicle is traveling on a dirt or rough section of a road. One or more external sensors of the vehicle may detect that the vehicle is traveling in poor visibility conditions (e.g., in the rain, snow, etc.). One or more sensors or systems of the vehicle (e.g., an active suspension system) may detect that a road is bumpy. Poor visibility, rough roads, high speeds, and congestion may be factors that increase a probability of vapor slug activity due to hitting unexpected bumps or potholes.

The vapor slug data may include one or more operating conditions of the vehicle. A temperature of fuel in a fuel tank of the vehicle may be high, which may increase the probability of a vapor slug being generated. An altitude of the vehicle may be elevated, which may increase the probability of a vapor slug being generated. A Reid Vapor Pressure (RVP) of the fuel of the vehicle may be high, which may increase the probability of a vapor slug being generated. A fuel level of the fuel, an ethanol content of the fuel, steering wheel input, and an engine run time may also be contributing factors to a vapor slug. One or more vehicle conditions such as length of drive cycle, model and year of vehicle, suspension system, engine displacement, and/or vehicle dynamics may also be included as factors that may contribute to vapor slug generation. The vapor slug data may also include road condition data, road pitch data, and in the case of a multi-lane road, a lane of the vehicle. It should be appreciated that the examples provided herein are for illustrative purposes, and other types of data may be included in the vapor slug data without departing from the scope of this disclosure.

The vapor slug data may also include driver data, such as driver experience, driving style of a driver of the vehicle, etc. An experienced driver may have a driving style characterized by smooth accelerations and decelerations and cautious behaviors under uncertain road conditions, where the experienced driver may anticipate and/or detect potholes or obstacles in a road before encountering them, thereby reducing a probability of a fuel slosh that could generate vapor slug activity. An inexperienced driver may have a driving style characterized by rapid or abrupt accelerations and decelerations and impatient behaviors, where the inexperienced driver may not anticipate and/or detect potholes or obstacles prior to encountering them, thereby increasing the probability of vapor slug activity as a result of a fuel slosh.

In one example, the vapor slug data is transmitted to the remote server via a V2V network (e.g., the V2V network 360 of FIG. 3), and the vapor slug data is stored in a road condition database (e.g., the road condition database 326 of FIG. 3). As described in greater detail below, the vapor slug data may be accessed by other vehicles of the V2V network, for example, to identify and avoid vapor slug generation at a predicted location. Additionally, or alternatively, one or more elements of the vapor slug data may be transmitted directly to one or more vehicles of the V2V network. For example, the vehicle may transmit the location of the vapor slug to a following vehicle, so that the following vehicle can adjust a route of the following vehicle.

For example, a controller of the vehicle may determine via an onboard navigation system that the vehicle is operating on an urban road with multiple lanes. The controller may detect, via the one or more external cameras and/or sensors of the vehicle, that other vehicles are in close proximity and that visibility is poor, and may further detect via an engine or wheel sensor that a speed of the vehicle is reduced, from which the controller may infer that the vehicle is operating in heavy traffic. The vehicle may hit an unexpected pothole, which generates a vapor slug. Upon generating the vapor slug, the vehicle may transmit vapor slug data to the remote server, which includes a location of the pothole; a road type, a presence of multiple lanes, a poor visibility, and a reduced speed collected from sensors of the vehicle; a RVP and temperature of the fuel of the vehicle and an altitude of the vehicle; and driver performance data indicating a driving style corresponding to an inexperienced driver. The remote server may store the vapor slug data in a database, whereby the vapor slug data may be accessed by the remote server and/or a second vehicle to be used to predict vapor slug activity on a route of the second vehicle, as described in greater detail below.

Once the vapor slug data has been transmitted to the cloud-based server, method 400 proceeds to 410, where vehicle operation is continued.

Figure 5:
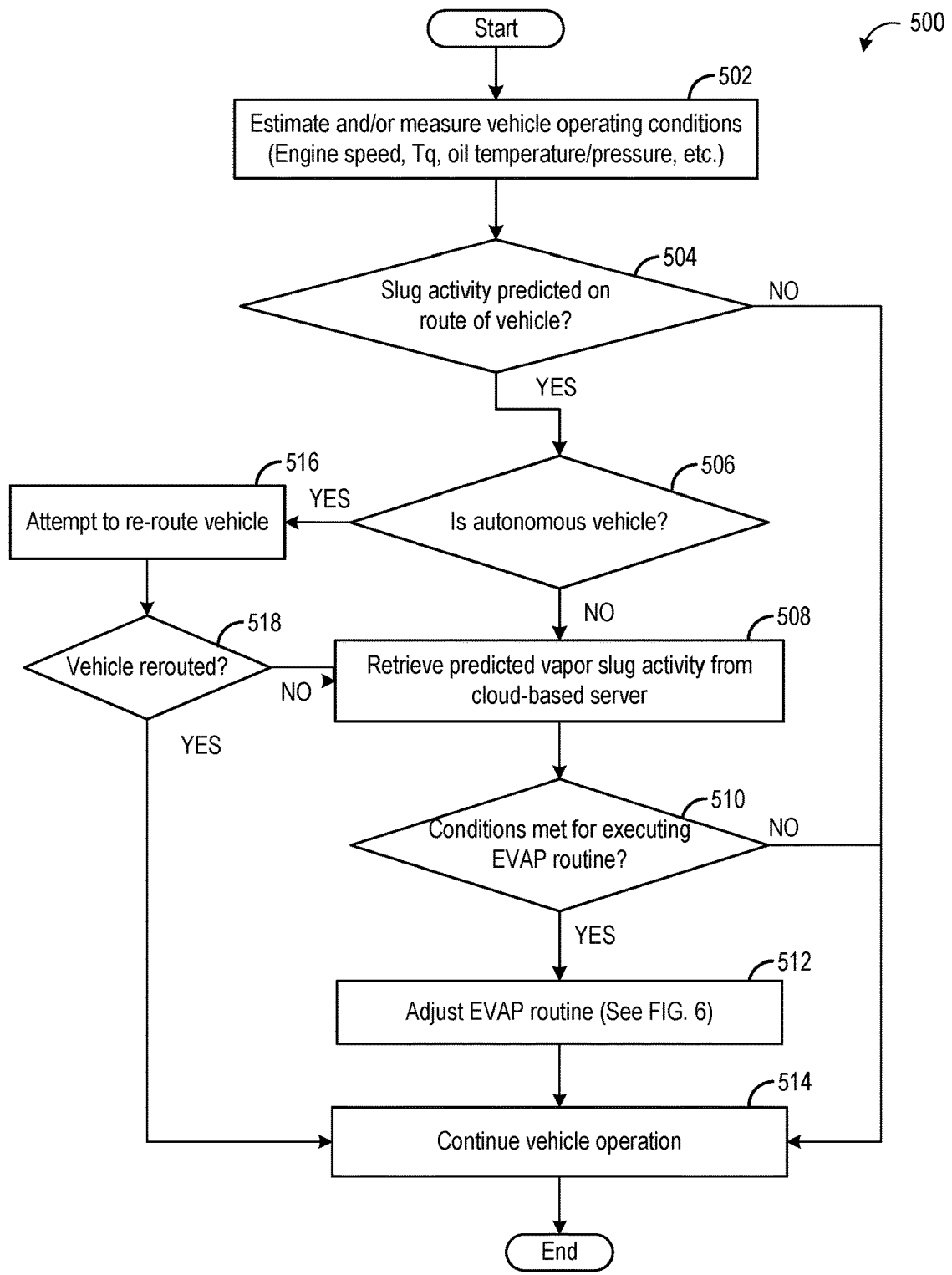
FIG. 5 is a flowchart illustrating an example method for initiating an EVAP routine of a vehicle based on predicted vapor slug activity.

Referring now to FIG. 5, an exemplary method 500 is shown for determining whether to execute a routine of an EVAP system of a vehicle in anticipation of a predicted vapor slug. At 502, method 500 includes estimating and/or measuring vehicle operating conditions. As described above in relation to method 400, vehicle operating conditions may be estimated based on one or more outputs of various sensors of the vehicle, as described above. Estimating and/or measuring vehicle operating conditions may include determining a state of an engine of the vehicle or a fuel system of the vehicle, such as a level of fuel in the fuel tank, and determining a state of one or more valves of the fuel system.

At 504, method 500 includes determining whether slug activity is predicted on a route of the vehicle. In one example, slug activity is predicted on the route of the vehicle if a remote server (e.g., the cloud-based server 325 of FIG. 3) notifies a controller of the vehicle of previous vapor slug activity generated at a location on the route of the vehicle (e.g., by a previous vehicle as described above in reference to method 400). For example, an onboard navigation system may suggest the route based on a destination selected in the onboard navigation system by a driver of the vehicle. The controller may transmit the suggested route of the vehicle to a program running on the remote server. The program may search a road condition database (e.g., the road condition database 326 of FIG. 3) and output one or more road conditions identified at one or more locations on the route, where one of the one or more road conditions may be vapor slug activity. In other examples, the road condition database may be communicatively coupled to the onboard navigation system, and location-tagged road condition (e.g., predicted vapor slug) data may be retrieved by the controller from the onboard navigation system.

If vapor slug activity is not predicted on the route of the vehicle at 504, method 500 proceeds to 514. At 514, method 500 includes continuing vehicle operation. If vapor slug activity is predicted on the route of the vehicle at 504, method 500 proceeds to 506. At 506, method 500 includes determining whether the vehicle is an autonomous vehicle. In one example, the vehicle is part of an autonomous ride-sharing fleet, where the vehicle is routed to a destination selected by a rider of the vehicle. In some examples, the vehicle may be unoccupied (e.g., on route to pick up a driver, returning to a base of operations, etc.), and the route of the vehicle may be adjusted to avoid the predicted vapor slug. In other examples, the vehicle may be occupied by a rider, and a route of the vehicle may not be adjusted.

If at 506 it is determined that the vehicle is an autonomous vehicle, method 500 proceeds to 516. At 516, method 500 includes attempting to reroute the vehicle. In one example, the location of the vapor slug activity is on a multi-lane road, and rerouting the vehicle includes selecting an alternate lane of the multi-lane road at the location of the vapor slug activity to avoid a road condition associated with the vapor slug activity. In other examples, rerouting the vehicle includes selecting an alternate route of the vehicle to avoid the road condition associated with the vapor slug activity. In still other examples, no alternate routes of the vehicle are available, and no alternate lanes of the route are available, and the vehicle is not rerouted. At 518, method 500 includes determining whether the vehicle has been rerouted or not. If at 518 it is determined that the vehicle has been rerouted, method 500 proceeds to 514, and vehicle operation is continued. If the vehicle is not rerouted at 518, method 500 proceeds to 508.

If at 506 it is determined that the vehicle is not an autonomous vehicle, method 500 proceeds to 508. At 508, method 500 includes retrieving a predicted vapor slug activity from the remote server. In one example, the predicted vapor slug activity is saved in the road condition database, whereby if a road condition exists at a location on the route of the vehicle, the predicted vapor slug activity is transmitted to the controller of the vehicle as part of the road condition data. In addition to the location of the predicted vapor slug activity, other data may be transmitted to the vehicle, such as the vapor slug data described above in reference to method 400. For example, the remote server may transmit additional road condition data such as type of road, number of lanes, etc. In some examples, the remote server may transmit congestion information and/or weather and/or environmental information retrieved from one or more traffic, weather, meteorological, or geographic databases, which may be considered by the controller of the vehicle in mitigating or averting the predicted vapor slug activity. In other examples, the remote server may request additional data from the vehicle, or data from the vehicle may be transmitted to the remote server along with the route of the vehicle, and the remote server may adjust the predicted vapor slug activity based on the additional data. For example, the remote server may compare one or more operating conditions of the vehicle, vehicle data of the vehicle, driver performance data of a driver of the vehicle, etc. with stored vapor slug data in the road condition database. If a similarity exists between the one or more operating conditions of the vehicle, vehicle data of the vehicle, driver performance data of a driver of the vehicle, etc. and the vapor slug data stored in the road condition database, the remote server may predict vapor slug activity for the vehicle at the location. If no similarity exists between the one or more operating conditions of the vehicle, vehicle data of the vehicle, driver performance data of a driver of the vehicle, etc. and the vapor slug data stored in the road condition database, the remote server may not predict vapor slug activity for the vehicle at the location. In other examples, the remote server may transmit a degree of confidence in the predicted vapor slug activity, where the degree of confidence may be higher if a similarity exists between the one or more operating conditions of the vehicle, vehicle data of the vehicle, driver performance data of a driver of the vehicle, etc. and the vapor slug data stored in the road condition database. In some examples, the remote server may determine whether the vehicle may be prone to vapor slug activity by analyzing the one or more operating conditions of the vehicle, vehicle data of the vehicle, driver performance data of a driver of the vehicle, etc. in accordance with a matrix plot of aggregated vapor slug data from the road condition database, as described in greater detail below in relation to FIG. 8.

At 510, method 500 includes determining whether conditions for executing the routine of the EVAP system (herein, the "EVAP routine") are met. The conditions for executing the EVAP routine may include being within a threshold predicted travelling time of the predicted vapor slug activity. In one example, the threshold travelling time to the vapor slug activity is 30 seconds, whereby if a predicted travelling time of the vehicle to the vapor slug activity is less than 30 seconds, the condition of the vehicle being within the threshold predicted travelling time to the predicted vapor slug activity is met.

The conditions for executing the EVAP routine may include determining what other EVAP routines are being executed by the vehicle. For example, a condition for executing the EVAP routine may be delaying the EVAP routine until a suitable time in a purge cycle. The conditions for executing the EVAP routine may include determining a state of one or more valves of the EVAP system. For example, a condition for starting the EVAP routine may include closing or opening one or more of a canister purge valve (CPV), a fuel tank intake valve (FTIV), and a canister vent solenoid (CVS) (e.g., the CPV 261, the FTIV 252, and the CVS 297 of EVAP system 251 of FIG. 2).

If it is determined at 510 that the conditions for executing the EVAP routine are not met, method 500 proceeds to 514, and vehicle operation is continued. Alternatively, if it is determined at 510 that the conditions for executing the EVAP routine are met, method 500 proceeds to 512. At 512, method 500 includes executing the EVAP routine in anticipation of the predicted vapor slug. Executing the EVAP routine in anticipation of the predicted vapor slug may include, in one example, decreasing a purge flow rate of the EVAP system to reduce an impact to the engine of shutting of the purge flow in the event that the predicted vapor slug is generated on the route. Executing the EVAP routine is described below in relation to FIG. 6.

Figure 6:
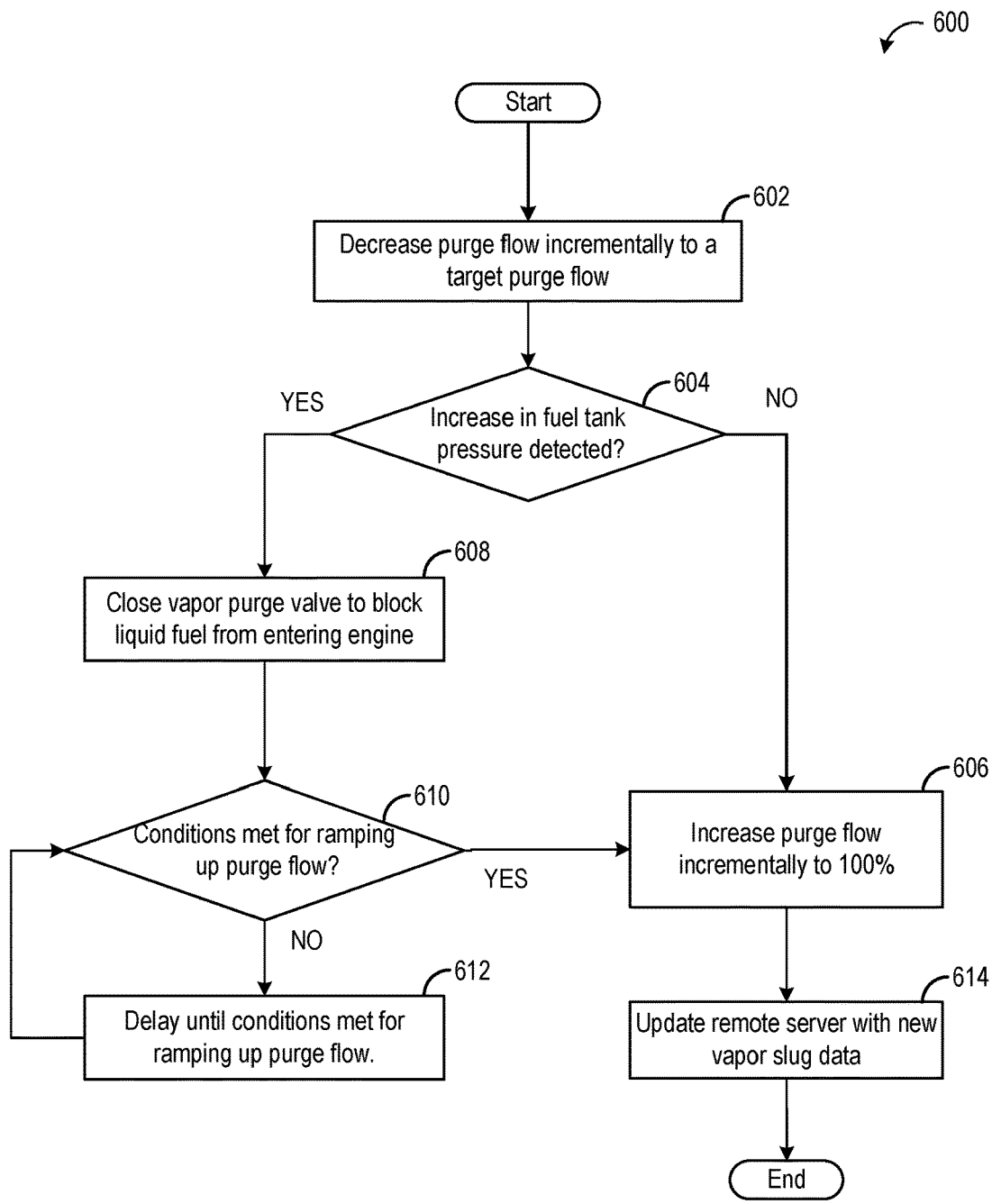
FIG. 6 is a flowchart illustrating an example method for adjusting an EVAP routine of a vehicle to ramp down a purge flow of the vehicle in anticipation of potential vapor slug activity.

Turning now to FIG. 6, an example method 600 is shown for executing a routine of an EVAP system (herein, the EVAP routine) of a vehicle to decrease a purge flow rate of the vehicle in anticipation of a predicted vapor slug. Method 600 may be carried out as a part of method 500 described above.

The purge flow may be defined as a flow of fuel vapors generated in a fuel tank of the vehicle through one or more vapor lines of the EVAP system to be purged into an intake of an engine of the vehicle during vehicle operation, thereby reducing a level of emissions of the vehicle and increasing a fuel efficiency of the vehicle. The fuel vapors of the fuel tank may be drawn into the vapor lines of the EVAP system by a force of an engine vacuum, where a purge flow rate is highest (e.g., at 100%) when a vapor purge valve of the EVAP system (e.g., the purge valve 261 of EVAP system 251 of FIG. 2) is completely open and the flow of fuel vapors out of the fuel tank is maximized. The force of the engine vacuum may decrease as the vapor purge valve is adjusted towards a closed position. As the force of the engine vacuum decreases, the purge flow rate may decrease. When the vapor purge valve is adjusted to a fully closed position, the purge flow rate may decrease to 0%.

At 602, method 600 includes decreasing the purge flow rate incrementally to a target purge flow. Decreasing the purge flow incrementally may include making small, discrete adjustments of the vapor purge valve over discrete time intervals to reduce the flow of fuel vapors through the EVAP system over time (herein, "ramping down"). For example, in anticipation of a predicted vapor slug, a controller of the vehicle may adjust a position of the vapor purge valve such that a first purge flow of 100% is reduced to a second purge flow of 95%. After a first passage of a time interval, the controller may adjust the position of the vapor purge valve such that the second purge flow of 95% is reduced to a third purge flow of 90%. After a second passage of the time interval, the controller may adjust the position of the vapor purge valve such that the second purge flow of 95% is reduced to a third purge flow of 90%, and so on. In this way, the purge flow rate may be incrementally reduced by 5% over a series of time intervals until the target purge flow is achieved. In one example, the target purge flow rate is 15%-25% purge flow. As an example, the time intervals between successive changes in purge flow may be equal or unequal, each time interval being in a range of 5-15 seconds.

The target purge flow rate may be a purge flow rate selected to minimize a disruption of an engine of the vehicle under both a scenario where a vapor slug is generated and a scenario where the predicted vapor slug is not generated. Under a scenario where the vapor slug is generated, the purge flow may be shut off (e.g., by adjusting the purge valve to a fully closed position) in order to avert a rich fuel excursion into the engine intake of the vehicle, which may cause an engine stall. However, shutting off a purge flow at 100% may cause the engine to hesitate or stumble. Further, shutting off the purge flow may reduce a cleanliness of a vapor canister of the EVAP system, thereby increasing the level of emissions generated by the vehicle. Additionally, after shutting off the purge flow to clear the vapor lines of the EVAP system, the purge flow is ramped up (e.g., increased incrementally) slowly to 100% to avoid engine hesitations. During a duration over which the purge flow rate is increased, an efficiency of the EVAP system may be reduced. Further, the efficiency of purging fuel vapors may be reduced in proportion to a length of the duration, where the longer the duration, the greater the reduction in efficiency.

By adjusting the purge flow to a lower, target purge flow, a time over which engine efficiency, purge cycle efficiency, and fuel efficiency are decreased may be reduced. For example, if the purge flow rate is at 100% and the purge flow is shut off in response to a vapor slug, a first disruption to the engine efficiency, purge cycle efficiency and fuel efficiency may be caused. Alternatively, if the purge flow is at lower, target level, a second disruption to the purge cycle efficiency and fuel efficiency may be caused, where the second disruption may be less than the first disruption. After the vapor slug is generated, or if the vapor slug is not generated, the purge flow rate may be ramped up (e.g., incrementally increased) to the 100% purge flow where the efficiency of the EVAP system is maximized. The target purge flow may be selected to minimize both the second disruption and a time of ramping up to 100% after the second disruption. In one example, the target purge flow is 15%-25%. In general, increases in fuel, engine, and purge cycle efficiency may be obtained by controlling a purge cycle of the vehicle dynamically via a proportional feed forward control rather than via bang-bang control in accordance with a step function.

At 604, method 600 includes determining whether an increase in fuel tank pressure is detected. If the vapor slug is generated, the vent valves of the fuel tank may be blocked, whereby fuel vapors may begin to build up in the fuel tank. As a result of a buildup of fuel vapors in the fuel tank, a pressure of the fuel tank may increase. In one example, the increase in pressure is detected by a fuel tank pressure sensor (e.g., the FTPT 291 of the fuel system 218 of FIG. 2). In one example, detecting an increase in fuel tank pressure includes measuring the pressure of the fuel tank to determine whether the measured pressure exceeds a threshold pressure (e.g., 5 InH2O).

If an increase in fuel tank pressure is not detected at 604, method 600 proceeds to 606. At 606, method 600 includes increasing a purge flow rate incrementally to 100% from the target purge flow. If an increase in fuel tank pressure is detected at 604, method 600 proceeds to 608. At 608, method 600 includes closing a CPV to block liquid fuel from entering the engine. For example, the CPV may be adjusted to a fully closed position as described above, whereby the purge flow rate is reduced to 0%. In one example, the CPV may be maintained in a closed position until one or more conditions have been met for increasing the purge flow rate up to 100%. At 610, method 600 includes determining whether the one or more conditions have been met for ramping up purge flow.

The one or more conditions for ramping up purge flow may include the vehicle leaving a location of vapor slug activity. For example, the vehicle may be notified of a predicted vapor slug at a location on a route of the vehicle by the remote server. In anticipation of the predicted vapor slug, the vehicle may ramp down the purge flow rate prior to reaching the location of the predicted vapor slug. Upon reaching the location of the predicted vapor slug (e.g., a location of a pothole in the road), the predicted vapor slug may be generated, and the purge flow may be shut off as described above. After the vapor slug is generated, the vehicle may proceed along the route, passing the location of the vapor slug. When the location of the vapor slug has been passed, it may be determined that a probability of additional vapor slugs being generated is below a threshold probability (e.g., 20%). In response to the probability of additional vapor slugs being generated being below a threshold probability, the controller of the vehicle may determine that the purge flow rate may be incrementally increased to 100%.

The one or more conditions for ramping up purge flow may include an absence of the vapor slug in the vapor lines. For example, after the CPV is closed to block fuel from entering the engine, the force of engine vacuum is reduced to zero, and the liquid fuel may drain out of the vapor lines and into the fuel tank, thereby clearing the vapor lines. If the vapor lines have not been cleared, the CPV may not be opened to allow venting to resume. Once the vapor lines have been cleared, the CPV may be opened to allow venting to resume.

If at 610 it is determined that conditions have not been met for ramping up the purge flow, method 600 proceeds to 612. At 612, method 600 includes delaying until conditions have been met for ramping up the purge flow. If at 610 it is determined that conditions have been met for ramping up the purge flow, method 600 proceeds to 606, and the purge flow rate is increased incrementally to 100%.

At 614, method 600 includes updating the remote server with new vapor slug data. For example, if a vapor slug is generated at the location of the predicted vapor slug, the controller of the vehicle may notify the remote server that the vapor slug activity continues to be present at the location of the predicted vapor slug, whereby it may be inferred that a source of the vapor slug (e.g., a pothole) has not been fixed. Alternatively, if a vapor slug is not generated at the location of the predicted vapor slug, the controller of the vehicle may notify the remote server that no vapor slug activity was generated at the location of the predicted vapor slug, whereby it may be inferred that the source of the predicted vapor slug has been fixed. In one example, if it is inferred that the source of the predicted vapor slug has been fixed, the remote server updates a road condition database (e.g., the road condition database 326 of FIG. 3) to remove the predicted vapor slug at the location, whereby other vehicles travelling on the route of the vehicle are not notified of the predicted vapor slug at the location. In other examples, it may be inferred that the predicted vapor slug was not generated due to mitigating actions taken by the vehicle (e.g., rerouting, changing lanes, driver caution, etc.), whereby the remote server may not update the road condition database to remove the predicted vapor slug at the location, and may continue to notify other vehicles travelling on the route of the vehicle of the predicted vapor slug.

Figure 7A:
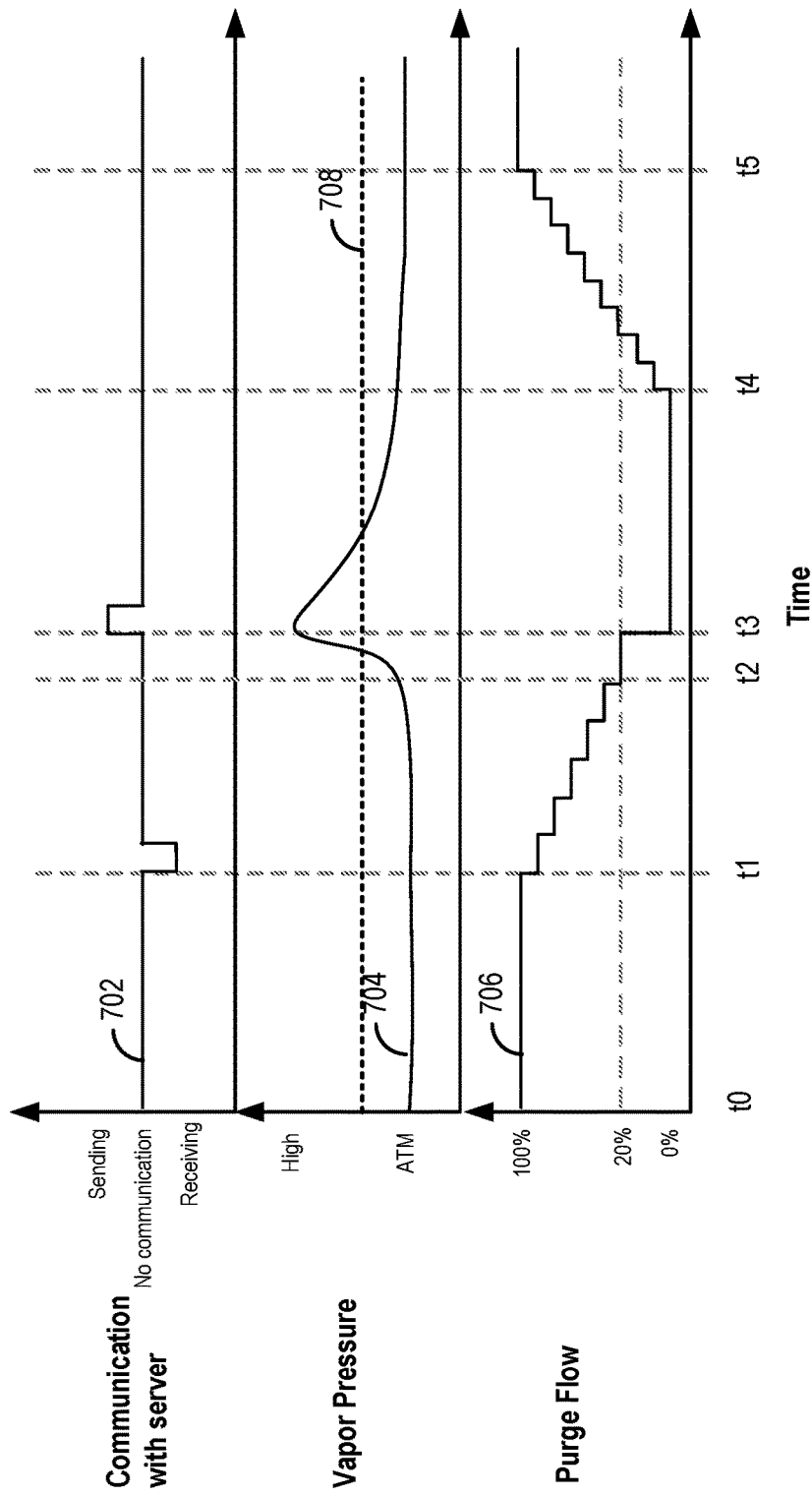
FIG. 7A is a timing diagram illustrating a timing of a purge flow of a vehicle when a predicted vapor slug occurs.
Figure 8:
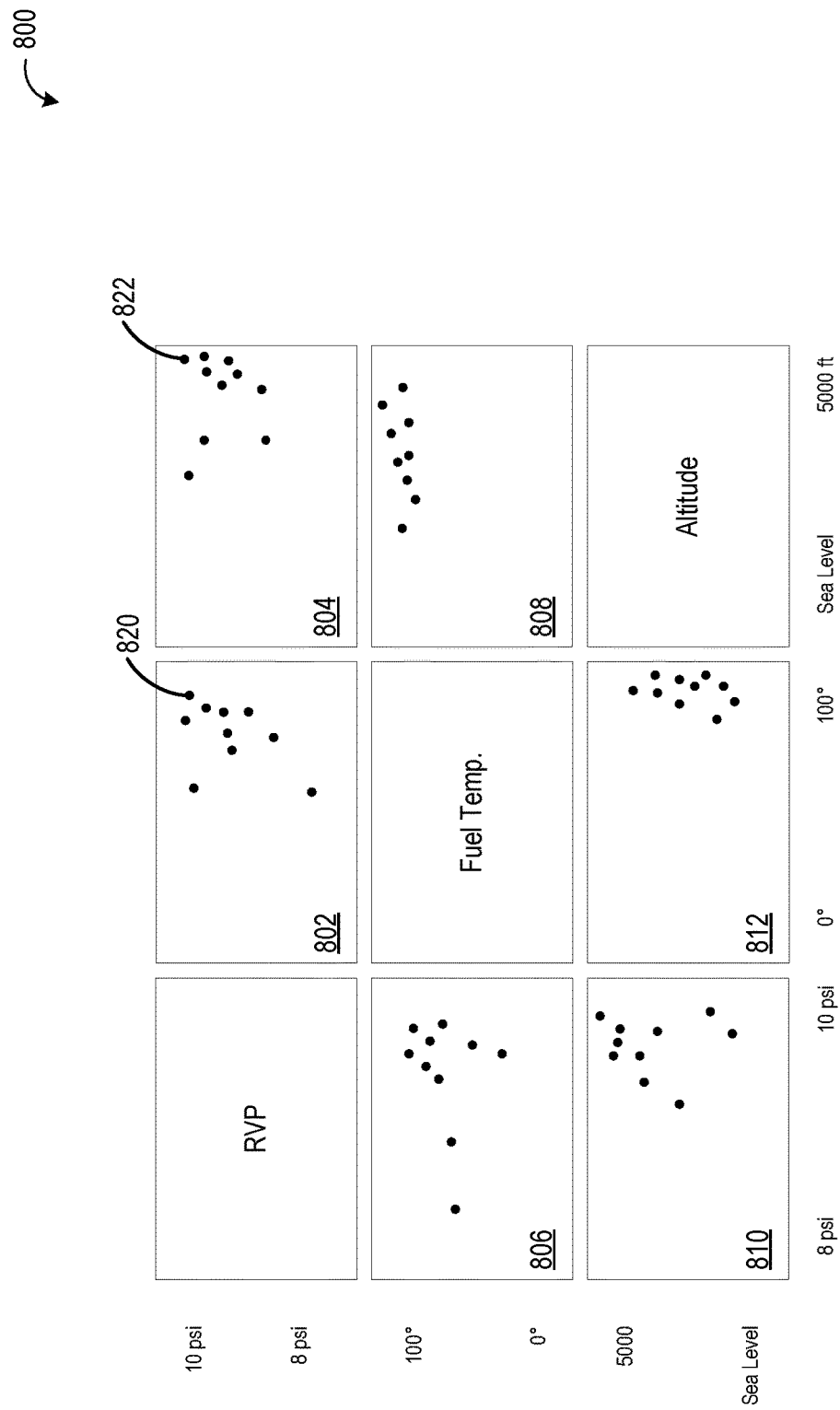
FIG. 8 is a matrix plot used to determine when a vehicle is prone to vapor slugs based on a plurality of operating conditions of the vehicle.

Referring now to FIG. 7A, an operating sequence 700 is shown that illustrates an example of an EVAP routine for adjusting a purge flow of an EVAP system of a vehicle in anticipation of a potential vapor slug, where the vapor slug is subsequently generated. The horizontal (x-axis) denotes time and the vertical lines t1-t5 identify significant times in the operation of the EVAP routine.

The operating sequence 700 includes three plots. The first plot, line 702, shows instances of a communication of a controller of the vehicle with a remote server (e.g., the cloud-based server 325 of FIG. 3). For example, the controller of the vehicle may be receiving data from the server via wireless communication, or the controller may be sending data to the server via wireless communication. The second plot, line 704, shows a variation in a pressure of the fuel tank as measured via a fuel tank pressure transducer (e.g., the FTPT 291 of FIG. 2). The pressure of the fuel tank may be high (e.g., if venting is not occurring), or the pressure of the fuel tank may be at atmospheric pressure (e.g., if venting is occurring). The third plot, line 706, shows a purge flow of the EVAP system, where the purge flow is a flow of fuel vapors of the fuel tank as the fuel vapors are vented via one or more vent valves (e.g., the GVV 287, FLVV 285, and/or GVV 283 of fuel system 218 of FIG. 2) to a canister of the EVAP system and/or an engine intake of the vehicle via a purge line (e.g., the canister 222 and purge line 228 of the EVAP system 251 of FIG. 2) during a purge cycle. For example, the purge flow rate may be at 100%, where a normal flow of fuel vapors of the fuel tank is vented from the fuel tank, or the purge flow rate may be less than 100%, where a reduced flow of fuel vapors of the fuel tank is vented from the fuel tank, or the purge flow rate may be 0%, where no fuel vapors of the fuel tank are vented from the fuel tank.

At time t0, the vehicle is operating along a route and a purge cycle of the EVAP system is running. Line 706 shows a purge flow rate of 100%, and line 704 indicates that a pressure of the fuel tank is at atmospheric pressure, indicating a normal venting of fuel vapors. Between t0 and t1, the vehicle is not in communication with the remote server.

At time t1, the vehicle receives a notification of predicted vapor slug activity at an upcoming location on the route, as indicated by line 702. In response to the notification of predicted vapor slug activity, the controller begins to ramp down the purge flow, as indicated by line 706. Between time t1 and t2, the purge flow continues to be incrementally decreased until t2. As the purge flow is decreased, the vapor pressure remains constant at atmospheric pressure, indicating a continuation of normal venting of the fuel tank.

At time t2, the vehicle encounters a pothole, and a fuel slosh generates a vapor slug as liquid fuel enters the purge line. Due to the vapor slug, venting of the fuel tank is blocked, and as a result, the pressure of the fuel tank increases abruptly between t2 and t3 as indicated by line 704, where line 704 passes a threshold pressure 708.

At time t3, the pressure increase is detected by a fuel tank pressure sensor (e.g., the FTPT 291 of fuel system 218 of FIG. 2), whereby a vapor slug is inferred by the controller due to the pressure exceeding the threshold pressure 708. As a result of inferring the vapor slug, the purge flow is shut off (e.g., decreased to 0%) to avert a rich fuel excursion that could generate an engine stall, as indicated by line 706. A notification of vapor slug activity is sent to the remote server, as indicated by line 702, including a location of the vapor slug activity and additional vapor slug data.

Between time t3 and t4, the purge flow rate remains at 0%, as indicated by line 706. The pressure of the fuel tank slowly decreases to atmospheric pressure as the liquid fuel drains out of the vapor lines into the fuel tank, as indicated by line 704. After sending the notification, there is no further communication with the remote server, as indicated by line 702.

At time t4, the pressure of the fuel tank has decreased to atmospheric pressure, which is detected by the fuel tank pressure sensor, as indicated by line 704. In response to the pressure of the fuel tank decreasing to atmospheric pressure, the controller infers that the vapor slug has drained into the fuel tank and that the vapor lines have been cleared of liquid fuel, and that desired venting has resumed. Consequently, the purge flow rate is incrementally increased between t4 and t5 until achieving 100% purge flow rate, as indicated by line 706. At t5, 100% purge flow is achieved, where the EVAP system resumes operation at maximum efficiency.

Figure 7B:
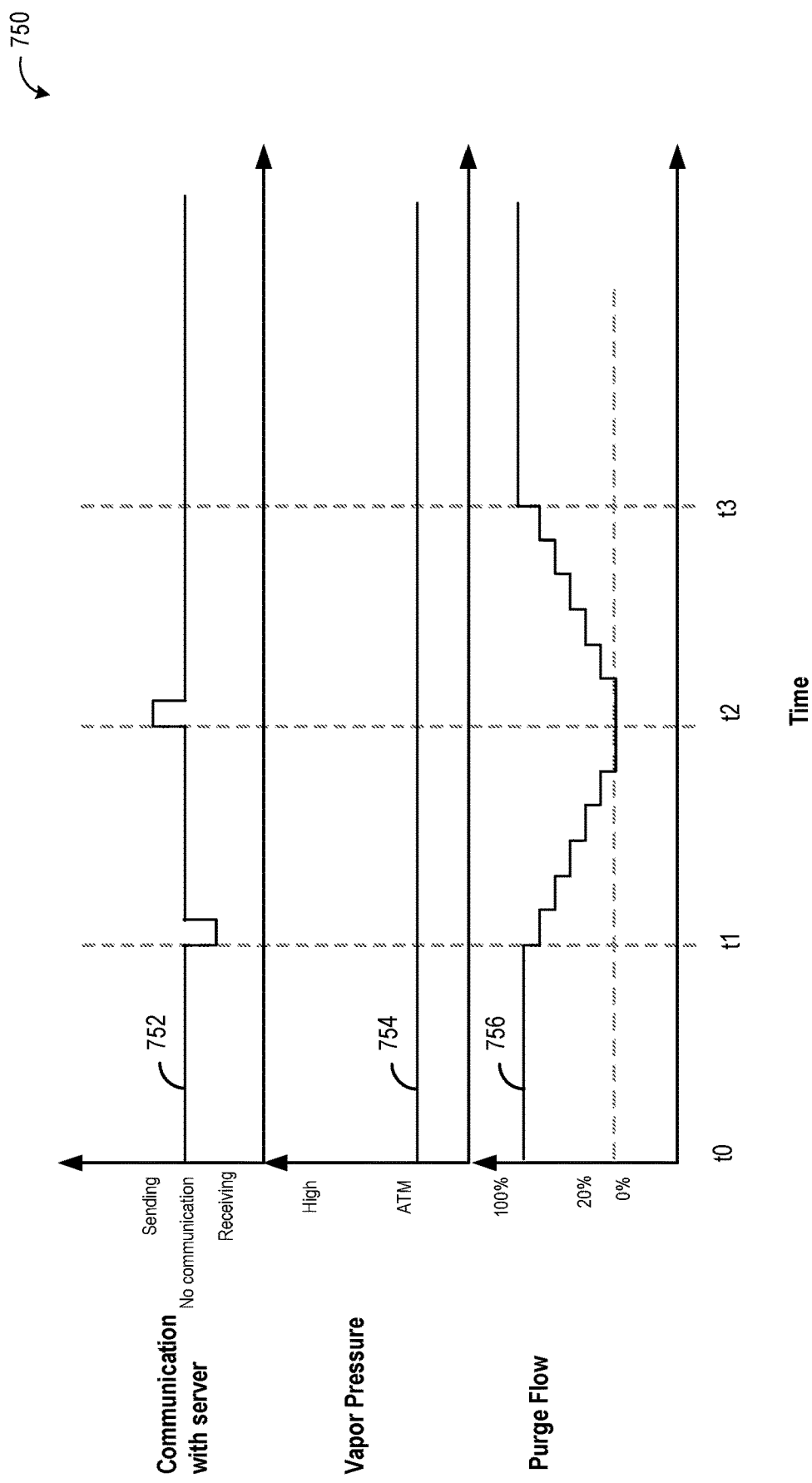
FIG. 7B is a timing diagram illustrating a timing of a purge flow of a vehicle when a predicted vapor slug does not occur.

FIG. 7B shows an operating sequence 750 that illustrates an example of an EVAP routine for adjusting a purge flow of an EVAP system of a vehicle in anticipation of a potential vapor slug, where the vapor slug is not generated. The horizontal (x-axis) denotes time and the vertical lines t1-t3 identify significant times in the operation of the EVAP routine.

The operating sequence 750 includes three plots. The first plot, line 752, shows instances of a communication of a controller of the vehicle with a remote server (e.g., the cloud-based server 325 of FIG. 3). For example, the controller of the vehicle may be receiving data from the server, or the controller may be sending data to the server. The second plot, line 754, shows a variation in a pressure of the fuel tank as measured via a fuel tank pressure transducer.

The pressure of the fuel tank may be high (e.g., if venting is not occurring), or the pressure of the fuel tank may be at atmospheric pressure (e.g., if venting is occurring). The third plot, line 756, shows a purge flow of the EVAP system, where the purge flow is a flow of fuel vapors of the fuel tank as the fuel vapors are vented via one or more vent valves to a canister of the EVAP system and/or an engine intake of the vehicle via a purge line during a purge cycle. For example, the purge flow rate may be at 100%, where a normal flow of fuel vapors of the fuel tank is vented from the fuel tank, or the purge flow rate may be less than 100%, where a reduced flow of fuel vapors of the fuel tank is vented from the fuel tank, or the purge flow rate may be 0%, where no fuel vapors of the fuel tank are vented from the fuel tank.

At time t0, the vehicle is operating along a route and a purge cycle of the EVAP system is running. Line 756 shows a purge flow rate of 100%, and line 754 indicates that a pressure of the fuel tank is at atmospheric pressure, indicating a normal venting of fuel vapors. Between t0 and t1, the vehicle is not in communication with the remote server.

At time t1, the vehicle receives a notification of predicted vapor slug activity at a location on the route, as indicated by line 752. In response to the notification of predicted vapor slug activity, the controller begins to ramp down the purge flow, as indicated by line 756. Between time t1 and t2, the purge flow rate continues to be incrementally decreased until t2. As the purge flow rate is decreased, the vapor pressure remains constant at atmospheric pressure, indicating a continuation of normal venting of the fuel tank.

At time t2, no potholes or other obstacles are encountered at the location of the predicted vapor slug activity. The pressure of the fuel tank remains at atmospheric pressure between t2 and t3, as indicated by line 754. As a result of the pressure of the fuel tank remaining constant, the controller of the vehicle infers that no vapor slugs were generated, and a notification of no vapor slug activity is sent to the remote server, as indicated by line 752. In one example, the remote server updates a road condition database to remove the predicted vapor slug activity at the location from the road condition database, whereby other vehicles on the route are not notified of the predicted vapor slug activity.

Between t2 and t3, the purge flow rate is incrementally increased until achieving 100% purge flow, as indicated by line 756. At t3, 100% purge flow is achieved, where the EVAP system resumes operation at maximum efficiency.

Referring now to FIG. 8, an example matrix plot 800 is shown which may be used to determine if a vehicle is prone to vapor slugs, based on a plurality of operating conditions of the vehicle. The matrix plot 800 may be generated and/or used by a program running on a remote server (e.g., the cloud-based server 325 of FIG. 3) accessible to a vehicle via a V2V network. In some examples, the matrix plot 800 may be used to predict a drive zone that is prone to vapor slug generation, in order to proactively ramp down purge flow prior to a vapor slug event.

The matrix plot 800 a matrix with 3 rows and 3 columns, representing 3 variables, where the variables are vehicle operating conditions relevant to vapor slugs. The vehicle operating conditions relevant to vapor slugs may include an RVP of liquid fuel of the vehicle, where a vehicle fueled with a high RVP fuel (e.g., 11-15 psi) may experience vapor slugs more frequently than a vehicle fueled with a low RVP fuel (e.g., 5-6 psi). The vehicle operating conditions relevant to vapor slugs may include a fuel tank temperature and a fuel level, where a high fuel tank temperature (e.g., 100 degrees) or a low fuel level may increase a probability of a fuel slosh occurring. For example, a fuel slosh may occur if the vehicle brakes suddenly, or hits a pothole in a road. If the level of the fuel is low and the temperature of the fuel is high, a fuel slosh may be more likely than if the temperature of the fuel is low and the level of the fuel is high. When a fuel slosh occurs, a vapor slug may be generated if liquid fuel enters a vapor recovery line via one or more passive vent valves.

The vehicle operating conditions relevant to vapor slugs may include an altitude of the vehicle. When a first vehicle is operating at a high altitude (e.g., 5000 feet of elevation), due to the high altitude, a vapor pressure of the fuel tank of the first vehicle may be lower than a vapor pressure of a fuel tank of a second vehicle operating at a low altitude (e.g., at sea level). As a result of the lower vapor pressure of the fuel tank of the first vehicle, the first vehicle may be more prone to vapor slug generation than the second vehicle.

The vehicle operating conditions relevant to vapor slugs may include a length of a drive cycle of the vehicle. Based on the manufacturer and emissions standards corresponding to a location of the vehicle (e.g., region, country, state, etc.), some vehicles may have a short drive cycle (e.g., 15 minutes), while other vehicles may have a longer drive cycle (e.g., 60 minutes). Vehicles with longer drive cycles may have an increased probability of vapor slug activity, where self-testing of emissions systems (e.g., for new cars, after repairs, etc.) may report lower rates of meeting the emissions standards. Other factors such as vehicle dynamics may also be included in the vehicle operating conditions.

In some examples, the vehicle operating conditions may include driver performance from data collected by one or more sensors of the vehicle (e.g., the sensors 308 of control system 302 of FIG. 3), where one or more driving characteristics of a driver of the vehicle may be inferred from the driver performance data. For example, an output of an accelerator pedal position sensor may indicate a heavy-footedness of the driver; an output of one or more wheel sensors may indicate a frequency of changing lanes (e.g., weaving in and out); or abrupt movements of a steering wheel of the vehicle may indicate an increased level of distraction of the driver. Heavy foot, impatient, and or distracted drivers may incur vapor slugs more frequently than drivers who tend to accelerate and manoeuver the vehicle more smoothly.

The data on operating conditions and/or driver performance upon which the matrix 800 is based may be received and aggregated from a plurality of vehicles that are operated by a plurality of drivers, where each vehicle of the plurality of vehicles is operating under different operating conditions. For example, some of the vehicles may be operating in environments where an ambient temperature is high (e.g., 100°), while other vehicles may be operating in environments where the ambient temperature is low (e.g., freezing or below freezing). Data may be received from vehicles that have recently initiated operation, and/or vehicles that have been operating for long periods of time (e.g., several hours). Each vehicle may have different vehicle dynamics, which may change over time in operation.

Example matrix plot 800 shows a 6 scatterplots, each scatterplot of which includes a number of points corresponding to vapor slugs generated in the plurality of vehicles. For example, each of plots 802, 804, 806, 808, 810, and 812 includes 10 points, representing 10 vapor slugs generated in 10 vehicles, where each point represents one vapor slug generated in one vehicle of the plurality of vehicles. In some cases, more than one vapor slug may be generated in one vehicle (e.g., the same vehicle), where two points in the same scatterplot may represent two vapor slugs generated in a single vehicle at two different times, or two points in two different scatterplots may represent two vapor slugs generated in a single vehicle at two different times.

The points of each of the plots 802, 804, 806, 808, 810, and 812 are plotted with respect to a horizontal axis and a vertical axis, where the horizontal axis (displayed horizontally below a column of the scatterplot) corresponds to the operating condition displayed in the column of the scatterplot, and where the vertical axis (displayed vertically along the left-hand side of a row of the scatterplot) corresponds to the operating condition displayed in the row of the scatterplot. Thus, each scatterplot shows an influence of two variables on each vapor slug displayed as a point, out of a total of three variables, where the three variables are the operating conditions RVP, fuel temperature, and altitude. In other example matrix plots, the number of variables may be greater or less than 3, and/or the number of scatterplots may be greater or less than 6. For example, a matrix plot may have 4 variables, arranged in 4 rows and 4 columns.

As one example, plot 802 comprises 10 points, showing 10 vapor slugs generated in 10 vehicles. Each point in plot 802 indicates a vapor slug generated in a vehicle, where the coordinates of the point are an RVP measurement (e.g., ranging between 8 psi and 10 psi, as shown on the vertical axis) and a fuel temperature measurement (e.g., ranging between 0° and 100°, as shown on the horizontal axis). Thus, an example point 820 in plot 802 indicates a vapor slug event in which a fuel of the vehicle (e.g., gasoline) has an RVP of 10 psi and a temperature of 100°. As a second example, plot 804 comprises 10 points, showing 10 vapor slugs generated in 10 vehicles. Each point in plot 804 indicates a vapor slug generated in a vehicle, where the coordinates of the point are an RVP measurement and an altitude of the vehicle (e.g., ranging between sea level and 5000 ft as shown on the horizontal axis). Thus, an example point 822 in plot 804 indicates a vapor slug event in which a fuel of the vehicle (e.g., gasoline) has an RVP of 10 psi and an altitude of the vehicle of 5000 feet.

Alternatively, two points in two different scatterplots may represent a single vapor slug (e.g., the same vapor slug), where different variables (e.g., operating conditions) are represented. As a third example, point 820 and point 822 may represent a single vapor slug event in a single vehicle, where plot 802 shows an interaction between the RVP and the temperature of the fuel of the vehicle, and plot 804 shows an interaction between the RVP and the altitude of the vehicle.

Further, a clustering of the points of plots 802 and/or 804 may indicate an interaction between one or more operating conditions and a vapor slug event. For example, the points of plot 802 are clustered in an area of the plot that corresponds to high fuel temperatures and high RVP, from which it may be inferred that vapor slug events tend to occur when both RVP and fuel temperature are high. Similarly, the points of plot 802 are clustered in an area of the plot that corresponds to high RVP and high altitude, from which it may be inferred that vapor slug events tend to occur when both RVP and fuel temperature are high. However, the points of plot 808, which show an interaction between altitude and fuel temperature, are clustered along the top of the plot, but not clustered horizontally on the right hand side of the plot. From a clustering at the top of the vertical axis (e.g., fuel temperature) but not along the horizontal axis (e.g., fuel temperature), it may be inferred that vapor slug events tend to occur when the fuel temperature is high, but not necessarily as a result of high altitude (e.g., that there is less interaction between altitude and fuel temperature. One possible inference that may be drawn from plot 808 is that the vehicles associated with the vapor slugs displayed as points in plot 808 may be operating in a cold environment, where fuel temperature is a more reliable predictor of vapor slug activity than altitude.

Thus, by collecting data on vehicle operating conditions and/or driver performance data from the plurality of vehicles and drivers and plotting the vapor slugs generated in the plurality of vehicles in one or more matrix plots such as the example matrix plot 800, relationships and interactions may be extracted from the data that indicate which operating conditions and/or combinations of operating conditions may be correlated with an increased vapor slug activity. The operating conditions and/or combinations of operating conditions associated with the increased vapor slug activity may be inputted into a service operating on a remote server accessible to the plurality of vehicles, whereby a vehicle of the plurality of vehicles may transmit operating conditions of the vehicle to the service, and receive in response a probability that a vapor slug event may be generated in the vehicle. The probability may be used in conjunction with data on a route of the vehicle, whereby the service may predict a vapor slug event on the route of the vehicle at an upcoming location (e.g., where one or more other vehicles have experienced a vapor slug event).

As one example, a first vehicle may encounter a rough section of road at a location on a first route of the first vehicle, where the first vehicle experiences a vapor slug event. The first vehicle may transmit a first set of operating condition data and data about the vapor slug event to a remote server, including the location of the vapor slug event. The remote server may record the vapor slug event in a road condition database (e.g., the road condition database 326 of FIG. 3), along with the first set of operating condition data of the first vehicle. A second vehicle traveling along a second route may transmit the second route to the remote server, along with a second set of operating condition data of the second vehicle, and the remote server may consult the road condition database to determine whether any road conditions exist on the second route. The remote server may determine that the location of the vapor slug event transmitted by the first vehicle is on the second route of the second vehicle. In response to the vapor slug event (e.g., the rough section of road) occurring on the second route of the second vehicle, the remote server may compare the second set of operating condition data of the second vehicle with the first set of operating condition data of the first vehicle, whereby the remote server may determine that the second vehicle has similar operating conditions as the first vehicle. In response to the second vehicle having similar operating conditions as the first vehicle, the remote server may transmit a predicted vapor slug event to the second vehicle.

Alternatively, the remote server may compare the second set of operating condition data of the second vehicle with the first set of operating condition data of the first vehicle and determine that the second vehicle has operating conditions that are not similar to the first vehicle. For example, the first vehicle may have a fuel with a high RVP and a high temperature, while the second vehicle may have a fuel with a low RVP and a low temperature. In response to the second vehicle not having similar operating conditions as the first vehicle, the remote server may not transmit a predicted vapor slug event to the second vehicle.

In other examples, the remote server may use a matrix plot (e.g., the example matrix plot 800) previously generated from a plurality of vehicles to determine that the second vehicle is prone to vapor slug events based on the operating condition data of the second vehicle (for example, due to having a fuel with a high RVP and/or a high temperature, etc.), and may not compare the second set of operating condition data of the second vehicle with the first set of operating condition data of the first vehicle. In response to the second vehicle having operating conditions that are prone to vapor slug generation, the remote server may transmit a predicted vapor slug event to the second vehicle.

Further, in some examples, a degree a confidence in a prediction of a vapor slug may be transmitted to the second vehicle, whereby if the second vehicle has operating conditions that are prone to vapor slug generation, the remote server may transmit a predicted vapor slug event with a high degree of confidence to the second vehicle, and if the second vehicle has operating conditions that are not prone to vapor slug generation, the remote server may transmit a predicted vapor slug event with a high degree of confidence to the second vehicle. In some examples, the degree of confidence is based on an analysis of the operating conditions of the second vehicle based on conclusions drawn from an analysis of one or more matrix plots generated from operating condition data from the plurality of vehicles.

In this way, vapor slug activity at an upcoming location on a route of a vehicle may be predicted based on route, location, operating conditions, driver performance, and other data, which is transmitted to a remote server by the vehicle and processed by one or more programs running on the remote server to output and transmit back to the vehicle a predicted vapor slug event. As a result of the predicted vapor slug event, actions may be taken to avert a disruption of an EVAP system of the vehicle, whereby a cleanliness of a vapor canister of the vehicle may be maintained at a high level and emissions of the vehicle may be maintained at a low level. For autonomous vehicles, purge control system shutoffs may be avoided by rerouting the vehicles. For non-autonomous vehicles, a purge flow of the vehicle may be ramped down in anticipation of possible vapor slug activity, in order to reduce a probability of a predicted vapor slug event occurring and to maximize an efficiency of the EVAP system of the vehicle. If a vapor slug is generated, shutting off a reduced purge flow (e.g., at 20%) may result in less disturbance of engine combustion quality than reducing the purge flow rate from 100% to 0%. If a vapor slug is not generated, the purge flow may be ramped up to desired purge flow levels more rapidly, due to starting at the decreased purge flow rather than a purge flow of zero. Thus, by replacing a bang bang control of the purge cycle (e.g., where a canister purge valve is either fully opened or fully closed) with a proportional feed forward control, an overall fuel efficiency of the vehicle may be increased, and a level of emissions of the vehicle may be reduced by increasing vapor canister cleanliness. The technical effect of ramping down the purge flow rate of the vehicle in response to an anticipated vapor slug event is that engine hesitation in the event of shutting off the purge flow may be averted. An additional advantage of the EVAP routine disclosed herein is that data from a connected vehicle fleet may be leveraged to increase an accuracy of predicting future vapor slug events. Overall, by anticipating vapor slug activity and regulating purge flow rate incrementally as part of a feed forward control routine, emissions of the vehicle may be minimized and a fuel efficiency of the vehicle may be maximized. Further, by reducing engine hesitations and stalls, a performance of the vehicle may be improved, whereby a smoothness of a drive experience may be increased.

In another representation, the vehicle is an HEV.

The disclosure also provides support for a method for an engine coupled to a vehicle, comprising, upon approaching a location of a predicted vapor slug, ramping down a purge flow rate from a fuel vapor canister to an engine intake, the location of the predicted vapor slug inferred based on communication of the vehicle with one or more other vehicles and/or a network cloud. In a first example of the method, ramping down a purge flow rate includes progressively and incrementally reducing the purge flow rate from a desired purge flow to a target purge flow prior to reaching the location of the predicted vapor slug, the target purge flow lower than the desired purge flow and greater than zero purge flow. In a second example of the method, optionally including the first example, the method further comprises, in response to generation of a vapor slug at the location of the predicted vapor slug, stopping the purge flow, and in response to an absence of the vapor slug at the location of the predicted vapor slug, ramping up the purge flow rate from the target purge flow to the desired purge flow. In a third example of the method, optionally including the first and second examples, the method further comprises, in response to generation of the vapor slug at the location of the predicted vapor slug, ramping up the purge flow rate to the desired purge flow from the stopped the purge flow. In a fourth example of the method, optionally including the first through third examples, communication of the vehicle with one or more other vehicles and/or a network cloud includes communicating vapor slug data including a location of a vapor slug and storing the vapor slug data in a database. In a fifth example of the method, optionally including the first through fourth examples, the vapor slug data includes at least one of an operating condition, a vehicle condition, and performance data of a driver of the vehicle. In a sixth example of the method, optionally including the first through fifth examples, the operating condition includes at least one of a temperature of a fuel tank of the vehicle, a Reid Vapor Pressure (RVP) of a fuel of the vehicle, an altitude of the vehicle, a fuel level of the fuel tank of the vehicle, and an ethanol content of the fuel of the vehicle and wherein the vehicle condition includes at least one of a model of the vehicle, a year of the vehicle, a suspension system of the vehicle, and a drive cycle of the vehicle. In a seventh example of the method, optionally including the first through sixth examples, inferring the location of the predicted vapor slug is based on comparing at least one of a location of the vehicle, an operating condition, a vehicle condition, and performance data of a driver of the vehicle with vapor slug data for the location of the predicted vapor slug stored in the database. In an eighth example of the method, optionally including the first through seventh examples, inferring the location of the predicted vapor slug is based on comparing at least one of a location of the vehicle, an operating condition, a vehicle condition, and performance data of a driver of the vehicle with aggregated vapor slug data from the one or more other vehicles at one or more locations. In a ninth example of the method, optionally including the first through eighth examples, inferring the location of the predicted vapor slug is based on estimating whether the vehicle is prone to vapor slug generation, based on a model constructed from the aggregated vapor slug data, and an output of the model includes a degree of confidence in inferring the location of the predicted vapor slug. In a tenth example of the method, optionally including the first through ninth examples, the model constructed from the aggregated vapor slug data relies on one or more matrix plots to estimate whether the vehicle is prone to vapor slug generation, where the one or more matrix plots are populated from the aggregated vapor slug data.

The disclosure also provides support for a method for an engine coupled to an autonomous vehicle, comprising, prior to approaching a location of a predicted vapor slug, in response to availability of an alternate route, adjusting a route of the autonomous vehicle, the location of the predicted vapor slug inferred based on communication of the autonomous vehicle with one or more other vehicles and/or a network cloud. In a first example of the method, the method further comprises, in response to unavailability of the alternate route, prior to reaching the location of the predicted vapor slug, ramping down a purge flow of the autonomous vehicle from a 100% purge flow to a decreased purge flow. In a second example of the method, optionally including the first example, the decreased purge flow is 15%-25% purge flow. In a third example of the method, optionally including the first and second examples, the method further comprises, after passing the location of the predicted vapor slug, measuring a pressure of a fuel tank of the autonomous vehicle, and in response to a measured pressure being atmospheric pressure, ramping up the purge flow of the autonomous vehicle to 100%.

The disclosure also provides support for a system of a vehicle, comprising a controller, storing instructions in non-transitory memory that, when executed, cause the controller to transmit a route of the vehicle to a remote server, receive a location of a predicted vapor slug on the route of the vehicle from the remote server, and in response to the location of the predicted vapor slug, ramp down a purge flow of the vehicle from a desired purge flow to a target purge flow prior to reaching the location of the predicted vapor slug, and upon reaching the location of the predicted vapor slug, in response to a vapor slug being generated, shut off the purge flow of the vehicle, and after passing the location of the predicted vapor slug, ramp up the purge flow to the desired purge flow. In a first example of the system, the target purge flow is in a range of 15%-25% of the desired purge flow. In a second example of the system, optionally including the first example, generation of the vapor slug is confirmed based on a measured pressure of a fuel tank of the vehicle being above a threshold pressure. In a third example of the system, optionally including the first and second examples, the controller includes further instructions to transmit vapor slug data to the remote server after passing the location of the predicted vapor slug, the vapor slug data including the location of the predicted vapor slug, a presence or absence of a vapor slug at the location of the predicted vapor slug, and at least one of an operating condition, a vehicle condition, and performance data of a driver of the vehicle. In a fourth example of the system, optionally including the first through third examples, ramping up the purge flow to the desired purge flow after passing the location of the predicted vapor slug includes delaying ramping up the purge flow until a measured pressure of the fuel tank is atmospheric pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine coupled to a vehicle, comprising:
   upon approaching a location of a predicted vapor slug, ramping down a purge flow rate from a fuel vapor canister to an engine intake, the location of the predicted vapor slug inferred based on communication of the vehicle with one or more other vehicles and/or a network cloud.

2. The method of claim 1, wherein ramping down the purge flow rate includes progressively and incrementally reducing the purge flow rate from a desired purge flow rate to a target purge flow rate prior to reaching the location of the predicted vapor slug, the target purge flow rate lower than the desired purge flow rate and greater than zero purge flow.

3. The method of claim 2, further comprising, in response to generation of a vapor slug at the location of the predicted vapor slug, stopping the purge flow, and in response to an absence of the vapor slug at the location of the predicted vapor slug, ramping up the purge flow rate from the target purge flow to the desired purge flow.

4. The method of claim 3, further comprising, in response to generation of the vapor slug at the location of the predicted vapor slug, ramping up the purge flow rate to the desired purge flow from the stopped the purge flow.

5. The method of claim 1, wherein communication of the vehicle with the one or more other vehicles and/or the network cloud includes communicating vapor slug data including a location of a vapor slug and storing the vapor slug data in a database.

6. The method of claim 5, wherein the vapor slug data includes at least one of an operating condition, a vehicle condition, and performance data of a driver of the vehicle.

7. The method of claim 6, wherein the operating condition includes at least one of a temperature of a fuel tank of the vehicle, a Reid Vapor Pressure (RVP) of a fuel of the vehicle, an altitude of the vehicle, a fuel level of the fuel tank of the vehicle, and an ethanol content of the fuel of the vehicle and wherein the vehicle condition includes at least one of a model of the vehicle, a year of the vehicle, a suspension system of the vehicle, and a drive cycle of the vehicle.

8. The method of claim 6, wherein inferring the location of the predicted vapor slug is based on comparing at least one of a location of the vehicle, an operating condition, a vehicle condition, and performance data of a driver of the vehicle with vapor slug data for the location of the predicted vapor slug stored in the database.

9. The method of claim 6, wherein inferring the location of the predicted vapor slug is based on comparing at least one of a location of the vehicle, an operating condition, a vehicle condition, and performance data of a driver of the vehicle with aggregated vapor slug data from the one or more other vehicles at one or more locations.

10. The method of claim 9, wherein inferring the location of the predicted vapor slug is based on estimating whether the vehicle is prone to vapor slug generation, based on a model constructed from the aggregated vapor slug data, and an output of the model includes a degree of confidence in inferring the location of the predicted vapor slug.

11. The method of claim 10, wherein the model constructed from the aggregated vapor slug data relies on one or more matrix plots to estimate whether the vehicle is prone to vapor slug generation, where the one or more matrix plots are populated from the aggregated vapor slug data.

12. A method for an engine coupled to an autonomous vehicle, comprising:
prior to approaching a location of a predicted vapor slug, in response to availability of an alternate route, adjusting a route of the autonomous vehicle, the location of the predicted vapor slug inferred based on communication of the autonomous vehicle with one or more other vehicles and/or a network cloud.

13. The method of claim 12, further comprising, in response to unavailability of the alternate route:
prior to reaching the location of the predicted vapor slug, ramping down a purge flow of the autonomous vehicle from a 100% purge flow to a decreased purge flow.

14. The method of claim 13, wherein the decreased purge flow is 15%-25% purge flow.

15. The method of claim 13, further comprising:
after passing the location of the predicted vapor slug, measuring a pressure of a fuel tank of the autonomous vehicle;
in response to a measured pressure being atmospheric pressure, ramping up the purge flow of the autonomous vehicle to 100%.

16. A system of a vehicle, comprising a controller, storing instructions in non-transitory memory that, when executed, cause the controller to:
transmit a route of the vehicle to a remote server;
receive a location of a predicted vapor slug on the route of the vehicle from the remote server;
in response to the location of the predicted vapor slug, ramp down a purge flow of the vehicle from a desired purge flow to a target purge flow prior to reaching the location of the predicted vapor slug;
upon reaching the location of the predicted vapor slug, in response to a vapor slug being generated, shut off the purge flow of the vehicle; and
after passing the location of the predicted vapor slug, ramp up the purge flow to the desired purge flow.

17. The system of claim 16, wherein the target purge flow is in a range of 15%-25% of the desired purge flow.

18. The system of claim 16, wherein generation of the vapor slug is confirmed based on a measured pressure of a fuel tank of the vehicle being above a threshold pressure.

19. The system of claim 16, wherein the controller includes further instructions to transmit vapor slug data to the remote server after passing the location of the predicted vapor slug, the vapor slug data including:
the location of the predicted vapor slug;
a presence or absence of a vapor slug at the location of the predicted vapor slug; and
at least one of an operating condition, a vehicle condition, and performance data of a driver of the vehicle.

20. The system of claim 16, wherein ramping up the purge flow to the desired purge flow after passing the location of the predicted vapor slug includes delaying ramping up the purge flow until a measured pressure of the fuel tank is atmospheric pressure.

* * * * *